(12) United States Patent
Murakami et al.

(10) Patent No.: US 7,764,263 B2
(45) Date of Patent: Jul. 27, 2010

(54) DISPLAY APPARATUS AND DRIVER CIRCUIT OF DISPLAY APPARATUS HAVING PRECHARGED AND WRITTEN SIMULTANEOUSLY WITHOUT COLLISION

(75) Inventors: Yuhichiroh Murakami, Matsusaka (JP); Hajime Washio, Sakurai (JP)

(73) Assignee: Sharp Kabushiki Kaisha, Osaka (JP)

( * ) Notice: Subject to any disclaimer, the term of this patent is extended or adjusted under 35 U.S.C. 154(b) by 1520 days.

(21) Appl. No.: 11/053,172

(22) Filed: Feb. 9, 2005

(65) Prior Publication Data

US 2005/0179635 A1 Aug. 18, 2005

(30) Foreign Application Priority Data

Feb. 10, 2004 (JP) ............................. 2004-033988

(51) Int. Cl.
G09G 3/36 (2006.01)
(52) U.S. Cl. .......................... 345/100; 345/98; 313/484
(58) Field of Classification Search .................. 345/87, 345/94, 98, 99, 100; 313/448
See application file for complete search history.

(56) References Cited

U.S. PATENT DOCUMENTS

| | | | | |
|---|---|---|---|---|
| 5,038,139 | A * | 8/1991 | Fujisawa et al. | ............... 345/89 |
| 5,686,936 | A | 11/1997 | Maekawa et al. | |
| 5,903,234 | A | 5/1999 | Kimura | |
| 6,281,826 | B1 | 8/2001 | Kimura | |
| 6,492,972 | B1 | 12/2002 | Kubota et al. | |
| 6,724,361 | B1 | 4/2004 | Washio et al. | |
| 2003/0174115 | A1 | 9/2003 | Washio et al. | |
| 2003/0234761 | A1 * | 12/2003 | Washio et al. | ............... 345/100 |
| 2004/0012555 | A1 * | 1/2004 | Yamashita et al. | .......... 345/100 |
| 2005/0179635 | A1 * | 8/2005 | Murakami et al. | .......... 345/100 |

FOREIGN PATENT DOCUMENTS

| | | |
|---|---|---|
| EP | 0 553 823 A2 | 8/1993 |
| JP | 1011032 | 1/1998 |
| JP | 11-202296 | 7/1999 |
| JP | 11-272226 | 10/1999 |
| JP | 2000-235372 | 8/2000 |

* cited by examiner

*Primary Examiner*—Amare Mengistu
*Assistant Examiner*—Vinh T Lam
(74) *Attorney, Agent, or Firm*—Harness, Dickey & Pierce, P.L.C.

(57) ABSTRACT

A driver circuit of a display apparatus is provided with a nor circuit in each output line of a timing pulse. To the nor circuit, inputted are a timing pulse to be supplied to the output line and a pre-charge pulse for pre-charging a data signal line SL to which a write signal is being inputted based on the timing pulse. With this structure, it is possible to realize a driver circuit storing a pre-charge circuit of a display apparatus, which can surely prevent a collision between a pre-charge potential and a potential of a video signal in a signal supply line when pre-charging the signal supply line from a pre-charge power supply of a small driving performance, while maintaining the number of stages in the shift register to be the required minimum number.

18 Claims, 21 Drawing Sheets

DISPLAY APPARATUS AND DRIVER CIRCUIT OF DISPLAY APPARATUS HAVING PRECHARGED AND WRITTEN SIMULTANEOUSLY WITHOUT COLLISION

This Nonprovisional application claims priority under 35 U.S.C. §119(a) on Patent Application No. 2004-033988 filed in Japan on Feb. 10, 2004, the entire contents of which are hereby incorporated by reference.

FIELD OF THE INVENTION

The present invention relates to a driver circuit for supplying write signals to signal supply lines of a display apparatus after pre-charging the signal supply lines and also relates to the display apparatus.

BACKGROUND OF THE INVENTION

For an active matrix type liquid crystal display apparatus adopting the dot sequential driving method, when AC driving a liquid crystal panel, each data signal line is pre-charged before a pixel is supplied with a video signal via the data signal line, so that a predetermined amount of charge as desired can be stored in each pixel under stable conditions. In this case, when an attempt is made to pre-charge all the data signal lines at the same time, as the total wiring capacitance of all the data signal lines is large, the power supply of high driving performance is needed. In response, the structure in which the pre-charge is carried out in a unit of some data signal lines has been proposed.

For example, Japanese Laid-Open Patent Application 295520/1995 (Tokukaihei 7-295520/1995, published on Nov. 10, 1995 (corresponding to U.S. Pat. No. 5,686,936 issued on Nov. 11, 1997) hereinafter referred to as patent document 1) discloses the structure wherein when a video signal is supplied to a data signal line, a switch in another data signal line is switched ON with an input of the sampling signal of the video signal outputted from a shift register of the data signal line driver, to pre-charge the data signal line from a pre-charge power supply.

According to the foregoing structure, to dot sequentially output a video signal to each data signal line, a switch with a capacitive control terminal (gate, for example) of a MOSFET including a TFT, etc., is provided in each data signal line. This switch is switched between the conductive state and the non-conductive state by controlling a pre-charge voltage of the control terminal. A control signal (a gate signal, for example) for dot sequentially switching the switch is outputted from the shift register which is generally made up of flip flops of plural stages, after being horizontally shifted by the shift register. Incidentally, in each data signal line, also provided is another switch of the similar structure for pre-charging, which is switched between the conductive state and the non-conductive state.

Further, the foregoing structure of the patent document 1 realizes a smaller area for the pre-charge circuit while ensuring a sufficient frame area of the liquid crystal display apparatus, for example, by storing the pre-charge circuit inside the data signal line driver.

In the data signal line driver of the patent document 1, however, a signal for opening and closing the switch for sampling the video signal is also used as a signal for opening and closing the switch for pre-charging another data signal line, and a problem of deterioration in display quality is therefore liable to occur due to, for example, a less uniform display.

Namely, the pre-charge in the AC driving causes fluctuations in potential of each data signal line and a pixel capacitance, and such fluctuations are large and the polarity of the potential of each data signal line and a pixel capacitance is reversed from that in the previous sampling of the video signal. Therefore, a switching operation of the switch in this state causes a large impulse charging current. Here, as the control terminal of the switch is capacitive, via the capacitance of the control terminal, a relatively high frequency component of such large charging current is transferred to the control signal circuit of the switch via the capacitance of the control terminal, and causes fluctuations in potential of the control signal circuit, thereby causing fluctuations in video signal supplied to the data signal line. Such fluctuations in video signal cause deterioration in display quality, for example, due to a less uniform display.

In response, publication of a US Patent application of the applicant of the present application (No. 2003-0234761 published on Dec. 25, 2003 (hereinafter referred to as patent document 2)) discloses the structure in which an output circuit of a signal for opening/closing the switch for sampling and the output circuit of a signal for opening/closing the switch for pre-charging are not used in common. With this structure, the foregoing problem, i.e., a large current flowing in the data signal line due to the pre-charge causes fluctuations in potential of the video signal to be written in the data signal line, while a write signal is being inputted, via the capacitive control terminal of the pre-charge switch, can be prevented.

In the following, an example structure of the data signal line driver disclosed in the patent document 2 is explained in reference to FIG. 22 and FIG. 23.

As illustrated in FIG. 22, a data signal line driver 131 includes a shift register 131a and a sampling section 131b. This shift register 131a includes set-reset type flip flops srff1, srff2, ... of plural stages, and also includes switch circuits asw1, asw2, ... corresponding to respective stages.

These flip flops srff1, srff2, srff3 output output signals dq1, q1, q2, ... respectively. Then, the output signals q1, q2, ... from the flip flops srff2 and latter stages are respectively inputted to the switches v_asw1, v_asw2, ... via buffer Buf1, Buf2, ... of the sampling section 131b. Each of these switches v_asw1, v_asw2, ... of the sampling section 131b includes a capacitive control terminal, and conducts with an input of an output signal q1, q2. When the switch is conducted, the potential of an analog video signal VIDEO as inputted in common is outputted to the data signal lines sl1 and sl2, .... Namely, the output signals q1, q2, ... serve as timing pulses for sampling video signals VIDEO.

These output signals dq1, q1 and q2, ... are sequentially inputted to the switch circuits asw1, asw2, asw3, ... also as control signals. For these switch circuits asw1, asw2, asw3, ..., when a switch circuit in the odd-numbered stage is conducted, the switch circuit receives and outputs a clock signal sck. On the other hand, when a switch circuit in the even-numbered stage is conducted, the switch circuit receives and outputs a clock signal sckb. Here, the clock signal sckb is a reversed signal of the clock signal sck.

These switch circuits asw1, asw2, asw3 ... sequentially output output signals dsr1, sr1, sr2, ..., and each of these output signals dsr1, sr1, sr2, ..., serves as a set signal of the flip flop in the next stage and also serves as a reset signal of the flip flop srff in the previous stage. Here, these output signals dsr1, sr1, sr2, ... are also inputted to the switches p_asw2, p_asw3, ... of the sampling section 131b. To the flip flop srff1 on the first stage, a start pulse ssp is inputted as a set signal, and this start pulse ssp is also inputted to the switch p_asw1.

As in the case of the switches v_asw1, v_asw2, . . . , each of the switches p_asw1, p_asw2, . . . of the sampling section 131b has a capacitive control terminal, and is conducted with an input of a start pulse ssp, an output signal dsr1, sr1, sr2, . . . . When conducted, the switch outputs a pre-charge potential PVID of a common input signal to the data signal lines sl1, sl2, . . . . Namely, these start pulse ssp, output signals dsR1, sr1, sr2, . . . are control signals for pre-charging.

A plurality of scanning signal lines gl1, gl2, . . . are provided so as to cross the data signal lines sl1, sl2, . . . at right angle. Further, a plurality of pixels Pix1_1, Pix1_2, . . . are provided in a matrix form, respectively at intersections between the data signal lines s1 and the scanning signal lines g1.

FIG. 23 is a timing chart of the data signal line driver 131 of the foregoing structure. In the data signal line driver 131, a start pulse ssp as inputted is also inputted to the switch p_asw1, and the data signal line sl1 is pre-charged. In this state, as the switch v_asw1 is in the non-conductive state, a collision between the pre-charge potential PVID and a potential of the video signal VIDEO on the data signal line sl1 will not occur.

With an input of the start pulse ssp, the output signal dq1 is outputted from the flip flop srff 1, and the switch circuit asw1 is then conducted, and receives a clock signal sck and outputs an output signal dsr1. This output signal dsr1 serves as a set signal of the flip flop srff2, and the flip flop srff2 outputs an output signal q1.

With an input of the output signal q1, the switch asw 2 is conducted, and the switch asw2 receives a clock signal sckb and outputs an output signal sr1. The output signal q1 is inputted to the switch v_asw1 as a timing pulse via the buffer Buf1, and with an input of this output signal q1, the switch v_asw1 is conducted. As a result, the data signal line sl1 is supplied with the video signal VIDEO. In this state, as the start pulse ssp is in the Low level, the switch p_asw1 is set in the non-conductive state. Therefore, in this case also, a collision between the pre-charge potential PVID and a potential of the video signal VIDEO on the data signal line sl1 will not occur.

Incidentally, as the switch p_asw2 is conducted by the output signal dsr1, the video signal VIDEO is outputted to the data signal line sl1, and in the meantime, the data signal line sl2 is pre-charged.

In the foregoing manner, by repetitively carrying out the steps of supplying a video signal VIDEO to the data signal line sln after pre-charging the data signal line sln, and pre-charging a data signal line sl (n+1) while this video signal is being supplied, a dot sequential sampling is performed.

For example, Japanese Laid-Open Patent Application 135093/2001 (Tokukai 2001-135093, published on May 18, 2001 (corresponding to U.S. Pat. No. 6,724,361, issued on Apr. 20, 2004), hereinafter referred to as patent document 3) of the applicant of the present application discloses the structure wherein in response to an output of a set-reset type flip flop in each stage of the shift register, a switch circuit receives a clock signal, and this clock signal is used as a set signal of a set-reset type flip flop in the next stage.

Further, U.S. Pat. No. 6,724,361 issued on Apr. 20, 2004 of the applicant of the present application (hereinafter referred to as patent document 4), and Japanese Laid-Open Patent Application 339985/2000 (Tokukai 2000-339985, published on Dec. 8, 2000, (corresponding to Publication of a US Patent application No. 2003-0174115, published on Sep. 18, 2003) hereinafter referred to as patent document 5) disclose the structure wherein in response to an output of a set-reset type flip flop which constitutes each stage of the shift register, a clock signal is received and the clock signal as received is subjected to the level shifting, and the resulting clock signal as revel shifted is used as a set signal of the set-reset type flip flop in the next stage.

According to the structure of the data signal line driver disclosed in the patent document 2 by the applicant of the present application, a collision between the pre-charge potential PVID and the video signal VIDEO in the data signal line sl is liable to occur, and therefore a video signal potential cannot be written in the data signal line sl under normal conditions, resulting in a deterioration in image quality.

Here, explanations will be given by focusing on the data signal line sl2 in the second line. As illustrated in FIG. 23, an output signal dsr1 for opening and closing the switch p_asw2 for pre-charging the data signal line sl2 and an output signal q2 for opening and closing the switch v_asw2 for sampling the data signal line sl2 are in scyn with respective rise of clock signals sck and sckb which are mutually reversed signals, and it is designed so as to avoid superimposition between these output signals dsr1 and the output signal q2.

In practice, however, as the rise or fall of the pulse is dragged, a superimposition between output signals dsr1 and the output signal q2 may occur partially. Specifically, if the output signal q2 rises before the output signal dsr1 falls, both of the switch p_asw2 for pre-charging and the switch v_asw2 for sampling are set ON at the same time, and a collision between the pre-charge potential PVID and the video signal VIDEO on the data signal line sl2 may occur. Such collision causes fluctuations in video signal sampled to the data signal line sl2, resulting in deterioration in image quality.

The patent document 2 also discloses the structure of the data signal line driver wherein after the fall of a signal for opening/closing the switch for pre-charging, a signal for opening/closing the switch for sampling provided in the same data signal line is raised after the signal is delayed by a half clock cycle. With this structure, a collision between the a pre-charge potential and a video signal on the data signal line can be avoided.

For the display apparatus to be mounted on a portable equipment, etc., it is required to be small in size, and in particular, a frame outside the display area is required to be narrow to realize a compact size display apparatus. However, in order to delay the signal by a half clock cycle, it is required to increase the number of flip flops in the shift register, and which in turn causes an increase in an area of the frame outside the display area. Additionally, in view of the wiring of an output signal in the shift register, although it is demanded to use an output of the flip flop closest to the data signal line, it is not possible to meet such demand with the structure of the patent document 2.

As described, in a driver circuit of a display apparatus such as a conventional data signal line driver, etc., to pre-charge a signal supply line such as a data signal line by the pre-charge circuit stored in the apparatus from a pre-charge power supply of small driving capacity, it is not possible to realize a driver circuit storing a pre-charge circuit of a display apparatus, which can surely prevent a collision between the pre-charge potential and the video signal in a signal supply line when pre-charging the signal supply line from a pre-charge power supply of a small driving performance, while maintaining the number of stages of shift registers to be the required minimum number.

As explained, according to the foregoing conventional driver circuit of a display apparatus, in the case of pre-charging each signal supply line, such as a data signal line from a pre-charge power supply of small driving performance, by means of an internal pre-charge circuit, a collision between a pre-charge potential and a potential of a video signal in a signal supply line cannot be prevented while maintaining the number of stages of shift registers to be the required minimum number. Incidentally, the foregoing patent documents 3 through 5 fail to teach or suggest the pre-charge operation.

For example, Japanese Laid-Open Patent Application 216441/1993 ((Tokukaihei 05-216441/1993 published on Aug. 27, 1993) corresponding to a publication of EP Patent application No. 0,553,832 issued on Aug. 4, 1993; hereinafter referred to as patent document 6) merely discloses the structure which prevents a superimposition between adjacent sampling pulses, and this patent document 6 also does not mention the pre-charge operation.

SUMMARY OF THE INVENTION

It is an object of the present invention to provide a driver circuit storing a pre-charge circuit of a display apparatus, which can surely prevent a collision between a pre-charge potential and a potential of a video signal in a signal supply line when pre-charging the signal supply line from a pre-charge power supply of a small driving performance, while maintaining the number of stages in the shift register to be the required minimum number, and also to provide a display apparatus adopting such driver circuit.

In order to achieve the foregoing object, the first driver circuit of a display apparatus is characterized by including:

a writing circuit having a plurality of first switches respectively provided for signal supply lines of the display apparatus, the writing circuit being provided for inputting a write signal into each of the signal supply lines by conducting each of the plurality of first switches;

a shift register having flip-flops of plural stages, the shift register being provided for sequentially outputting a timing pulse from each of the flip-flops of plural stages to conduct each of the first switches; and a pre-charge circuit having a plurality of second switches respectively provided for the signal supply lines, the pre-charge circuit being provided for pre-charging each of the signal supply lines by conducting each of the plurality of second switches, wherein the shift register includes a plurality of pulse signal supply circuits provided corresponding to the signal supply lines to be pre-charged while an input operation of the write signal is being carried out, and each of the pulse signal supply circuits receives a clock signal different from the timing pulse, in response to an input of the timing pulse as outputted from each of the flip-flops, and outputs as a pre-charge pulse, a pulse signal in sync with the clock signal to a second switch corresponding to a prescribed signal supply line to which the input operation of the write signal is not being carried out to conduct the second signal; and in each output line of the timing pulse, provided is a superimposition preventing section made up of a superimposition removing circuit for removing from the timing pulse to be supplied to the output line, an overlapped part which is overlapped with the pre-charge pulse for pre-charging the signal supply line to which the input operation of the write signal is to be carried out by the timing pulse.

According to the foregoing structure, the first switch of the writing circuit is conducted by a timing pulse for use in inputting a write signal from each flip flop. On the other hand, the second switch of the pre-charge circuit is conducted by a clock signal which is different from the timing pulse as received by a pulse signal supply circuit.

In the effective writing period, an input operation of a write signal is being inputted to each signal supply line. However, when a timing pulse is outputted from the flip flop, a clock signal outputted from a pulse signal supply circuit which receives a timing pulse as outputted from the flip flop in the stage directly before that flip flop is used to pre-charge the prescribed signal supply line to which an input operation of a write signal is not being carried out.

As described, according to the foregoing characteristic of the present invention, while a write signal is being inputted in a signal supply line, it is possible to pre-charge another signal supply line. Here, a supply line for supplying timing pulse for inputting a write signal is provided separately from a supply line for supplying a pre-charge signal. Therefore, such problem that a large amount of current flowing into a signal supply line when pre-charging causes fluctuations in potential of the write signal of the signal supply line to which an input operation of the write signal is being carried out via the capacitive control terminals of the first switch and the second switch can be prevented. Then, according to the foregoing structure, the superimposition removing circuit provided in each output line of the timing pulse removes from the timing pulse to be supplied to the output line, an overlapped part which is overlapped with the pre-charge pulse for pre-charging the signal supply line to which the input operation of the write signal is to be carried out by the timing pulse. Therefore, even when using an output from the flip flop in which a fall edge of the pre-charge pulse is in sync with a rise edge of the timing pulse, the fall edge of the pre-charge pulse is not overlapped with the rise edge of the timing pulse. As a result, for a pair of a first switch and a second switch provided in each signal line, respectively for sampling and pre-charging, the first switch and the second switch will not be conducted at the same time, and a collision between the write signal and the pre-charge potential in the signal supply line can be surely prevented.

Incidentally, the superimposition between the timing pulses can be a cause of fluctuations in potential of the video signal line, which in turn causes deterioration in image quality due to less uniform display, for example. As described, however, by regulating the front edge of the timing pulse by the rear edge of the corresponding pre-charge pulse, the rear edge of the timing pulse may be also partially cut off depending on an amount of displacement of the rear edge of the pre-charge pulse, and in this case, it is also possible to prevent the superimposition between the timing pulses.

With this structure, it is possible to realize a driver circuit storing a pre-charge circuit of a display apparatus, which can surely prevent a collision between the pre-charge potential and the video signal in a signal supply line when pre-charging the signal supply line from a pre-charge power supply of a low driving performance, while maintaining the number of stages of shift registers to be the required minimum number.

The second driver circuit of the present invention having the structure of the foregoing first driver circuit is characterized in that:

the superimposition preventing section includes a pulse front edge cut-off circuit provided for each output line of the pre-charge pulse, the pulse front edge cut-off circuit being provided for cutting off a front edge of the pre-charge pulse to be supplied to the output line; and the pre-charge pulse having its front edge cut off by the pulse front edge cut-off circuit is inputted to the superimposition removing circuit.

According to the foregoing structure, as the pulse front edge cut off circuit cuts off the front edge of the pre-charge pulse, even when the front or rear edge of the pre-charge pulse is dragged, a superimposition between the pre-charge pulses can be avoided. As a result, in addition to the effect as achieved from the first driver circuit of the display apparatus, it is possible to surely prevent such problem that a data signal line which is not supposed to be charged is pre-charged, which may result in insufficient driving performance of the pre-charge power supply.

The foregoing first or second driver circuit of the display apparatus of the present invention may be characterized in that:

each of the flip flops is a set-reset type flip flop; and each of the plurality of pulse signal supply circuits outputs the pulse signal, also as a set signal of the flip flop in a subsequent stage of the flip flop which outputs the timing pulse.

The foregoing first or second driver circuit of the present invention may be characterized in that aid pulse signal supply circuit is a switch circuit, or the pulse signal supply circuit is a level shifter circuit.

According to the structure wherein a switch circuit is adopted for the pulse signal supply circuit, it is possible to reduce the size of the circuit. According to the structure wherein a level shifter circuit is adopted for the pulse signal supply circuit, it is possible to operate the shift register under normal conditions by level-shifting an input signal in the level shifter circuit, even when an externally input signal has a smaller amplitude than the driving voltage of the shift register, and the shift register cannot be operated under normal conditions without amplifying the input signal.

The foregoing first or second driver circuit of the present invention may be further characterized in that:

the output lines of the timing pulse are provided in number corresponding to the number of the signal supply lines so as to sequentially conduct each of the plurality of first switches; and the pulse signal supply circuits are provided in number corresponding to the number of the signal supply lines so as to sequentially conduct each of the plurality of second switches.

According to the foregoing structure, for the driver circuit adopting a so-called dot sequential driving method, wherein a write signal is sequentially inputted to each signal supply line based on a timing pulse from a flip flop, it is possible to provide a driver circuit storing a pre-charge circuit of a display apparatus, in which signal supply lines are dot sequentially conducted under the control by the switch circuit, which can surely prevent a collision between the potential of the pre-charge signal and the potential of the video signal in a signal supply line when pre-charging the signal supply line from a pre-charge power supply of a small driving performance, while maintaining the number of stages of shift registers to be the required minimum number.

The first and second driver circuit of a display apparatus of the present invention may be further characterized in that:

the output lines of the timing pulse are provided in number corresponding to the number of groups of the signal supply lines, each group being made up of signal supply lines in number of i (i is an integer of not smaller than 2), so as to conduct the plurality of first switches in such a manner that first switches in a same group conduct all at the same time, and the first switches in respective groups sequentially conduct; and the pulse signal supply circuits are provided in number corresponding to the number of the groups of signal supply lines so as to conduct the plurality of second switches in such a manner that second switches in a same group conduct all at the same time, and the second switches in respective groups sequentially conduct.

According to the foregoing structure, for the driver circuit adopting a so-called multipoint simultaneous driving method, wherein a write signal is sequentially inputted to each group of signal supply lines based on a timing pulse from a flip flop, it is possible to provide a driver circuit storing a pre-charge circuit of a display apparatus, in which signal supply lines are dot sequentially conducted under the control by the switch circuit, which can surely prevent a collision between the potential of the pre-charge signal and the potential of the video signal in a signal supply line when pre-charging the signal supply line from a pre-charge power supply of a small driving performance, while maintaining the number of stages of shift registers to be the required minimum number.

In order to achieve the foregoing object, a display apparatus of the present invention is characterized by including:

a plurality of pixels;

a plurality of data signal lines which serve as a plurality of signal supply lines, the plurality of data signal lines being provided so as to correspond to the plurality of pixels;

a plurality of scanning signal lines which serve as a plurality of signal supply lines, the plurality of scanning signal lines being provided so as to correspond to the plurality of pixels, a data signal line driver for writing a video signal as a write signal in the plurality of data signal lines and the plurality of pixels; and a scanning signal line driver for writing a scanning signal as a write signal in the plurality of scanning signal lines for selecting a pixel to which the video signal is written, wherein the data signal line driver may be any one of the foregoing structures of the present invention.

According to the foregoing structure of the present invention, in the data signal line driver, storing a pre-charge circuit, a collision between the pre-charge potential and the video signal in a signal supply line can be surely prevented when pre-charging the signal supply line from a pre-charge power supply of a small driving performance, while maintaining the number of stages of shift registers to be the required minimum number. It is therefore possible to realize high quality display apparatus with an improved display uniformity.

Additional objects, features, and strengths of the present invention will be made clear by the description below. Further, the advantages of the present invention will be evident from the following explanation in reference to the drawings.

DESCRIPTION OF THE EMBODIMENTS

First Embodiment

The following descriptions will explain one embodiment of the present invention with reference to FIGS. 1 through 3, and FIGS. 14 to 18.

Figure 1:
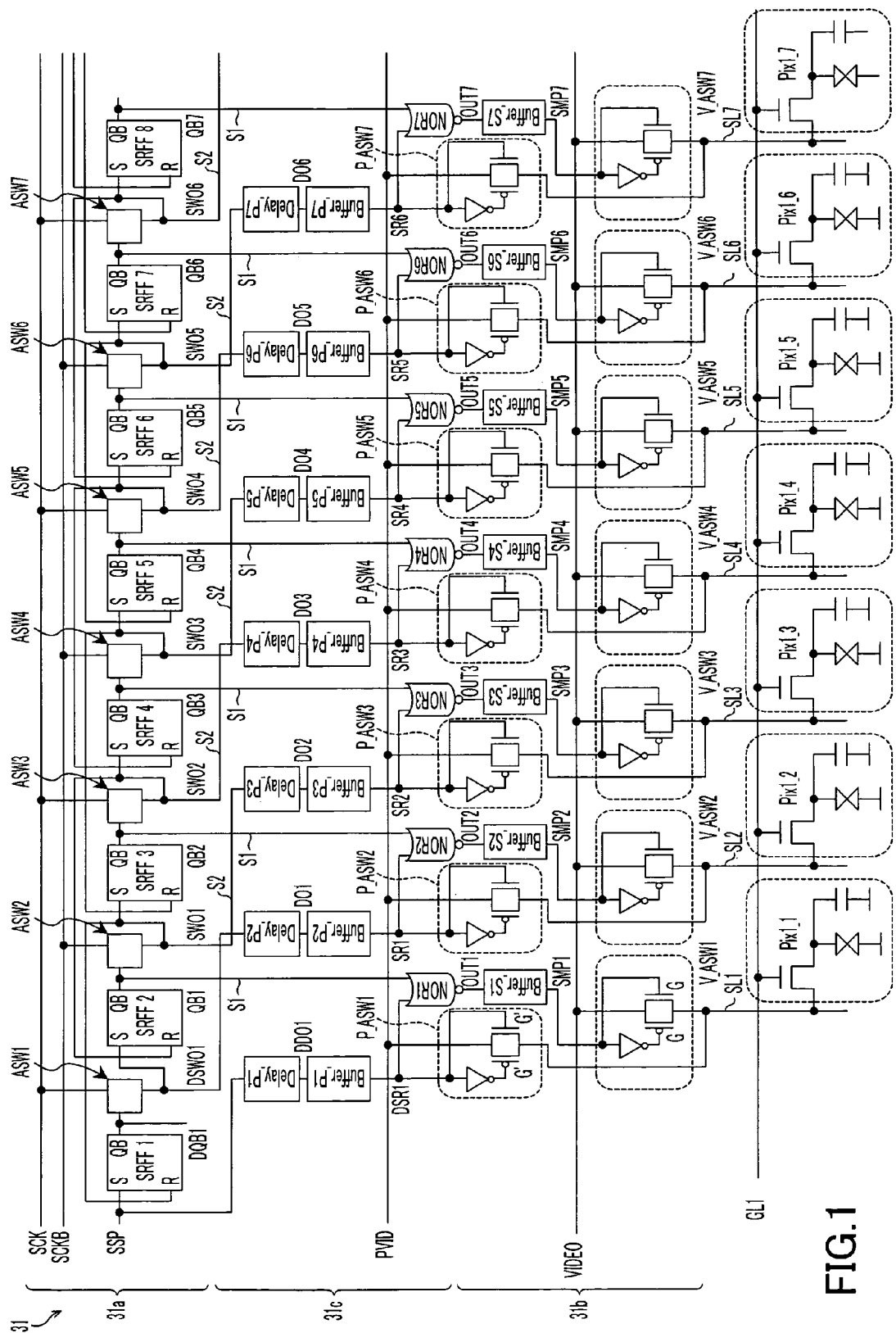
FIG. 1 is a circuit block diagram showing the structure of a data signal line driver in accordance with the first embodiment of the present invention.

A driver circuit of a display apparatus in accordance with the present embodiment is a data signal line driver of a liquid crystal display apparatus. FIG. 1 shows the structure of a data signal line driver 31.

The data signal line driver 31 includes a shift register 31a, a sampling section 31b and a superimposition preventing section 31c.

The shift register 31a includes plural stages of set-reset type flip-flops SRFF1, SRFF2, . . . , and plural switch circuits (pulse signal supply circuits) ASW1, ASW2, . . . . The switch circuit ASWk (k=1, 2, . . . ) is switched ON/OFF, i.e., between the conductive state and the non-conductive state based on Q output of the flip-flop SRFFk as a control signal. When an odd-numbered switch circuit ASWk is conducted, it receives a clock signal (pulse signal, pre-charge pulse) SCK as supplied from an external source, which is different from a timing pulse (to be described later), and also outputs the clock signal. Similarly, when an even-numbered switch circuit ASWk is conducted, it receives a clock signal (pulse signal, pre-charge pulse) SCKB as supplied from an external source, which is different from the timing pulse and outputs the clock signal. This clock SCKB is an inversed signal of the clock signal SCK.

The switch circuits ASW1, ASW2, . . . output the clock signal SCK, SCKB (output signals DSWO1, SWO1, SWO2, . . . , to be described later) to the switch P_ASW1, P_ASW1, . . . (to be described later) via a signal line S2, which is separately provided from a signal line S1 for transmitting the QB (Qbar, inversed Q) output of the flip-flop SRFF1, SRFF2, . . . . Further, the switch circuits ASW1, ASW2, . . . receive the clock signal SCK, SCKB from an external source via a signal line, which is separated from the signal line S1 for transmitting the QB output of the flip-flop SRFFk to the P_ASW1, P_ASW1, . . . (to be described later).

The switch circuit ASW1 outputs an output signal DSWO1, and the switch circuits ASW2, ASW3 . . . respectively output output signals SWO1, SWO2 . . . . An output signal of each of the switch circuit ASWk serves as a set signal of the flip-flop SRFF (k+1) in the next stage of the flip flop SRFFk (k=1, 2, . . . ) which receives an QB output, and also serves as a reset signal of the flip flop SRFF(k−1) in one stage before the flip flop SRFFk which receives the QB output.

Here, an output signal from each of the switch circuits ASW1, ASW2, . . . is inputted to the switch P_ASW2, P_ASW3, . . . provided in the pre-charge circuit of the sampling section 31b (to be described later). Namely, each of the output signals DSWO1, SWO1, SWO2, . . . , serves as a pre-charge pulse (to be described later). Further, as will be explained in detail later, an output signal from each switch circuit ASWk is inputted to a switch P_ASW2, P_ASW3, . . . via a delay circuit Delay_P2, Delay_P3, . . . , and a buffer circuit Buffer-P2, Buffer-P3, . . . provided in the superimposition preventing section 31c (to be described later).

Figure 14:
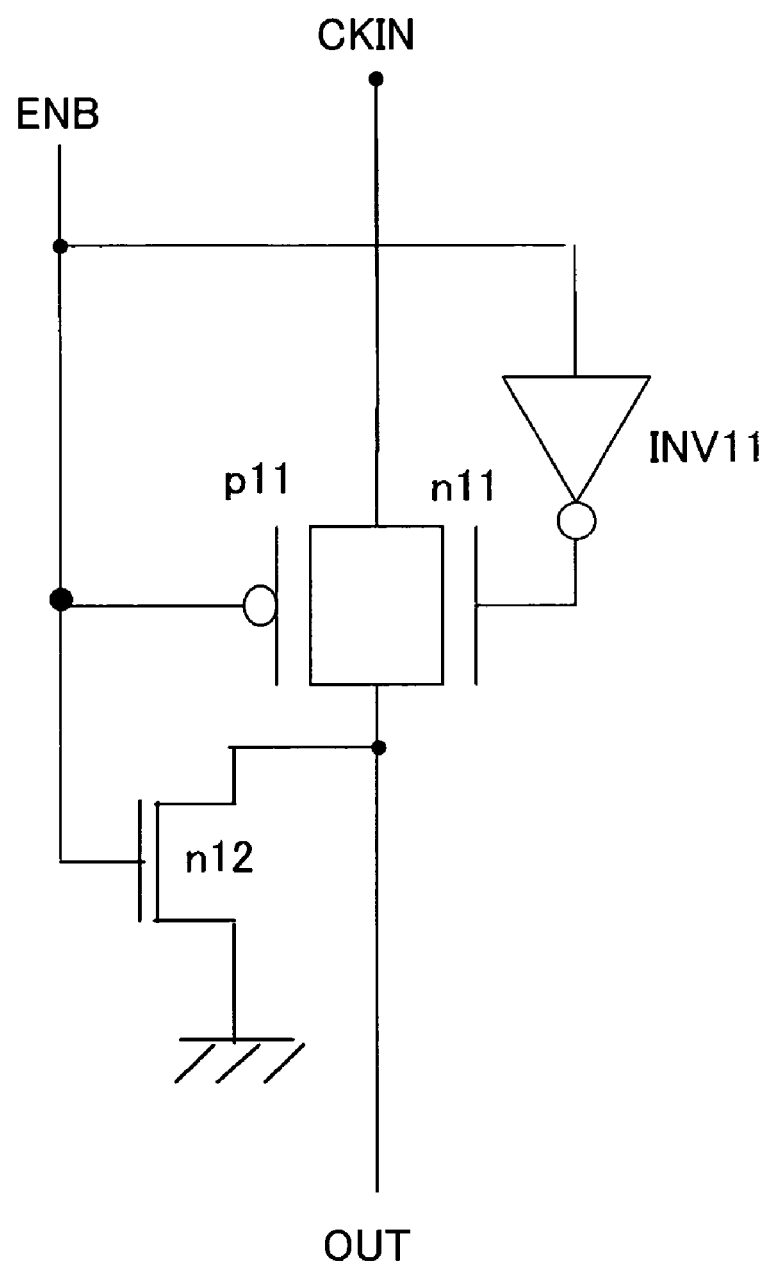
FIG. 14 is a circuit diagram showing the structure of one example of a switch circuit of the sampling section.

The following will explain an example of a switch circuit which can be used as switch circuits ASW1, ASW2, . . . with reference to FIG. 14. FIG. 14 is a circuit diagram showing one example of the structure of the switch circuit.

The switch circuit is made up of an inverter circuit INVl1, a CMOS switch including a p-channel MOS transistor pl1 and an n-channel MOS transistor nl1, and an n-channel MOS transistor nl2. This switch circuit operates based on a control signal ENB as externally supplied. Specifically, when the control signal ENB is in the Low level, the n-channel MOS transistor nl2 is closed, and the p-channel MOS transistor pl1 and the n-channel MOS transistor nl1 of the CMOS switch are open, and a signal CKIN externally supplied is outputted without being processed as an output signal OUT. On the other hand, when the control signal ENB is in the High level, the p-channel MOS transistor pl1 and the n-channel MOS transistor nl1 of the CMOS switch are closed, and the n-channel MOS transistor nl2 is open, and the output signal OUT is fixed in the Low level. The control signal ENB corresponds to the Q output of the flip-flop SRFFk of FIG. 1. The input signal CKIN corresponds to the clock signal SCK or the clock signal SCKB of FIG. 1. Further, the output signal OUT corresponds to the output signals DSWO1, SWO1, SWO2, . . . of FIG. 1.

The flip-flop SRFFk outputs a QB signal (inversed signal of the Q signal). The output signal of the flip-flop SRFFk is a signal DQB1, when K=1, and a signal QB1, QB2, . . . when K=2, 3 . . . . For a set signal of the first-stage flip-flop SRFF1, a start pulse SSP as externally supplied is used. This start pulse SSP also servers as a pre-charge pulse to be inputted to the switch P_ASW1. This start pulse SSP is also inputted to the switch P_ASW1 via the delay circuit Delay_P1 and the buffer circuit Buffer_P1 of the superimposition preventing section 31c.

The output signal DQB1 of the flip-flop SRFF1 is inputted to the switch circuit ASW1, and the output signals QB1, QB2, . . . of the flip-flop SRFF2, SRFF3, . . . are respectively inputted to the switch circuits ASW2 and ASW3, and are then inputted to the switches V_ASW1, V_ASW2 of the sampling section 31b (to be described later) via buffer circuits Buffer- S1, Buffer-S2, . . . of the sampling section 31b. Namely, the output signals QB1 and QB2 serve as timing pulses for sampling a video signal VIDEO (to be described later). Then, as will be explained in detail later, the output signals QB1, QB2, . . . are once inputted to nor circuits NOR1, NOR 2, . . . of the superimposition preventing section 31c (to be described later), and are then inputted to the buffer circuits Buffer-S1, Buffer-S2, . . . via the nor circuits NOR 1, NOR 2 . . . .

The sampling section (writing circuit, pre-charge circuit) 31b includes the buffer circuits Buffer_S1, Buffer_S2, . . . , the switches V_ASW1, V_ASW2, . . . and the pre-charge circuit. The pre-charge circuit includes the switches P_ASW1, P_ASW2, . . . . The writing circuit is made up of these buffer circuits Buffer_S1, Buffer_S2, . . . , and switches V_ASW1, V_ASW2, . . . .

Figure 15:
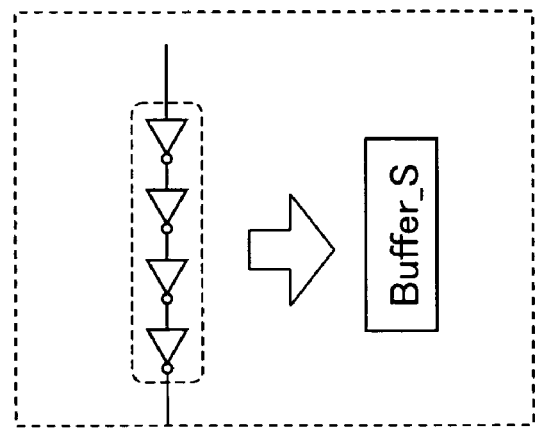
FIG. 15 is a circuit diagram showing the structure of one example of a buffer circuit of a sampling section.

As shown in FIG. 15, the buffer circuit Buffer_Sn (n=1, 2, . . . ) is connected to a set of four inverters which are cascade connected, and is supplied with an output signal (OUT1, OUT2, . . . , to be described later) of the NOR circuit NORn of the superimposition preventing section 31c, which are supplied with the output signals QBn (n=1, 2, . . . ) as outputted from the shift register 31a described earlier.

The switch V_ASWn (n=1, 2, . . . ) (first switch) includes (a) an analog switch which is made up of an n-channel MOS transistor (TFT) where an input signal is directly inputted to a gate (first control terminal) G, and a p-channel MOS transistor (TFT) where an inversed signal of the input signal is inputted to a gate G; and (b) an inverter circuit for inverting the input signal and inputting the inversed input signal to the gate G of the p-channel MOS transistor while maintaining the sufficient amount of charges for charging the capacitance of the gate G. This inverter circuit inverses the input signal and functions a part of the buffer circuit Buffer_Sn. The input signal of the foregoing analog switch is an output signal of the buffer circuit Buffer_Sn.

The gate G of each MOS transistor is a capacitive control terminal, and the switch V_ASWn is switched between a conductive state and a non-conductive state according to the charge voltage of the gate G. Further, one end of a channel path of the analog switch of each of the switches V_ASWn is supplied with a common analog video signal (write signal) VIDEO as externally supplied.

The switch P_ASWn (n=1, 2, . . . ) (second switch) includes (a) an analog switch which is made up of an n-channel MOS transistor (TFT) where the input signal is directly inputted to a gate (second control terminal) G', and a p-channel MOS transistor (TFT) where an inversed signal of the input signal is inputted to a gate G'; and (b) an inverter circuit for inverting the input signal and inputting the inversed input signal to the gate G' of the p-channel MOS transistor while maintaining the sufficient amount of charge for charging the capacitance of the gate G'. This inverter circuit inverses the input signal and functions as a part of the buffer circuit Buffer_Pn. As can be seen from the foregoing explanations, the input signal of the foregoing analog switch is the signal DSR1, SR1, SR2, . . . , obtained by outputting the start pulse SSP, the output signal DSWO1, SWO1, SWO2, . . . , which also serves as the set signal of the flip-flop SRFFk (k=n), via the delay circuit Delay_P1, Delay_P2, . . . , of the superimposition preventing section 31c and the buffer circuits Buffer-P1, Buffer-P2, . . . .

The gate G' of each of the MOS transistors is a capacitive control terminal, and the switch P_ASWn is switched between a conductive state and a non-conductive state according to the charge voltage of the gate G'. To one end of a channel path of the analog switch of each of the switches P_ASWn, inputted is a common pre-charge potential PVID, as externally supplied.

Further, the other end of the channel path of the analog switch of each of the switches V_ASWn and the other end of the channel path of the analog switch of each of the switches P_ASWn are connected to the data signal line (signal supply line) SLn (n=1, 2, . . . ) of a liquid crystal display panel. The liquid crystal display panel further includes scanning signal lines GL1, GL2, . . . , provided so as to cross the data signal lines SLn at right angle. Pixels Pixm-n (m=1, 2, . . . , n=1, 2, . . . ) are provided at respective intersections of the data signal lines SLn and the scanning signal lines GLm (m=1, 2, . . . ) in a matrix form. As in the generally used normal active matrix type liquid crystal display apparatus, each pixel has an n-channel MOS transistor (TFT), a liquid crystal capacitance, and an auxiliary capacitance. The scanning signal line GLm is selected at predetermined cycles, and during the selection period, the MOS transistor of the pixel connected to the scanning signal line GLm conducts.

The superimposition preventing section 31c includes the delay circuits Delay_P1, Delay_P2, . . . , (pulse front edge removing circuit), buffer circuits Buffer_P1, Buffer_P2, . . . and NOR circuits NOR1, NOR2, . . . (superimposition removing circuit).

The pulse front edge removing circuit is provided for making a rise (front edge) of the pulse of the input signal delay to cut off the front edge of the pulse. This pulse front edge removing circuit serves to surely prevent the superimposition between pre-charge pulses by cutting off the front edge of the pre-charge pulse. With this structure, it is possible to surely prevent such problem that a data signal line which is not supposed to be charged is pre-charged, which may result in insufficient driving performance of the pre-charge potential PVID.

Figure 16:
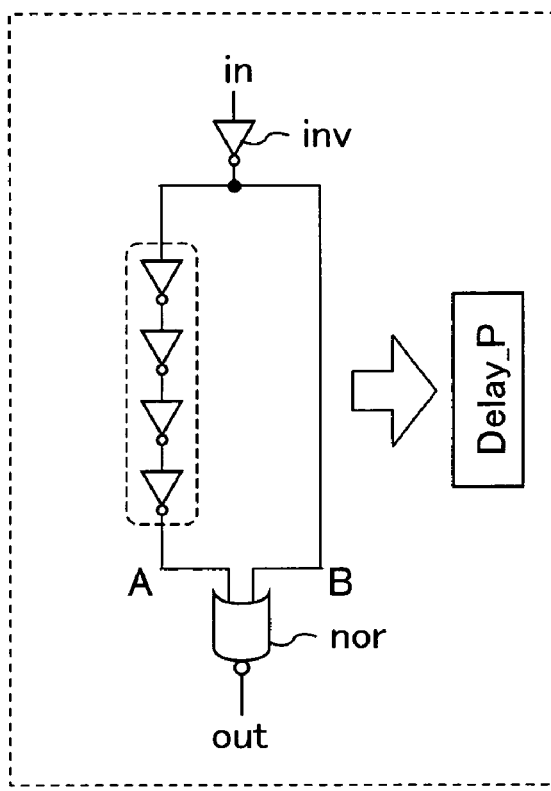
FIG. 16 is a circuit diagram showing the structure of one example of a delay circuit of an superimposition preventing section.
Figure 17:
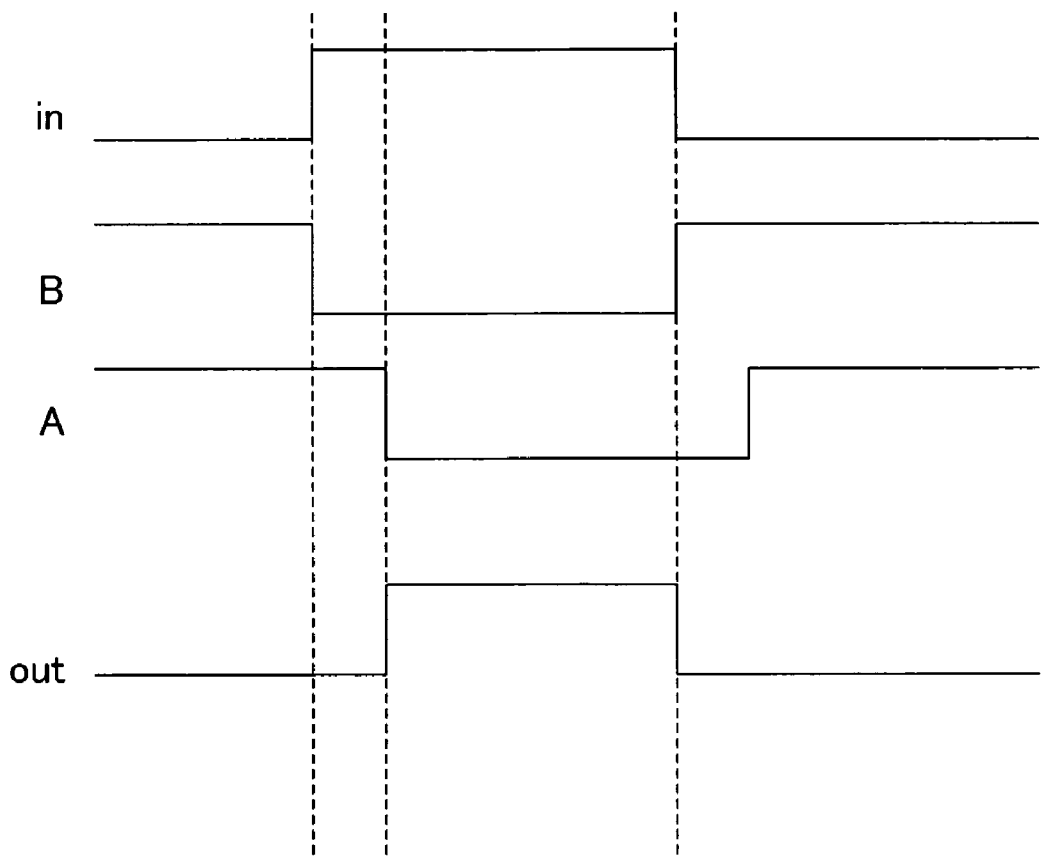
FIG. 17 is a timing chart showing a waveform of an input signal, an output signal in the delay circuit.

In the present embodiment, for the pulse front edge removing circuit, the delay circuit Delay_P shown in FIG. 16 is adopted. This delay circuit Delay_P is arranged such that the input signal in is inverted by the inverter circuit inv, and the input signal is then divided into two signals, one of which, i.e., the signal B is inputted to the NOR circuit nor without being processed, and the other of which, i.e., the signal A is inputted to the NOR circuit nor via plural inverter circuits for delay which are cascade connected. As shown in the timing chart of FIG. 17, the output signal out may be arranged so as to delay only the rise of the pulse (front edge) of the input signal without making the fall of the pulse delay.

The delay circuit Delay_Pn is provided in each output line for pre-charge pulse, which is connected from the shift register 31a to the switch P_ASWn of the sampling section 31b.

The input signal of the delay circuit Delay_P1 is the start pulse SSP, and an input signal of the delay circuit Delay_P2, Delay_P3, . . . is an output signal DSWO1, SWO1, . . . respectively. The output signals of the delay circuits Delay_P1, Delay_P2 are output signals DDO1, DO1, . . . . The output signal of each delay circuit Delay_Pn is inputted to the corresponding buffer circuit Buffer_P1, Buffer_P2.

Figure 18:
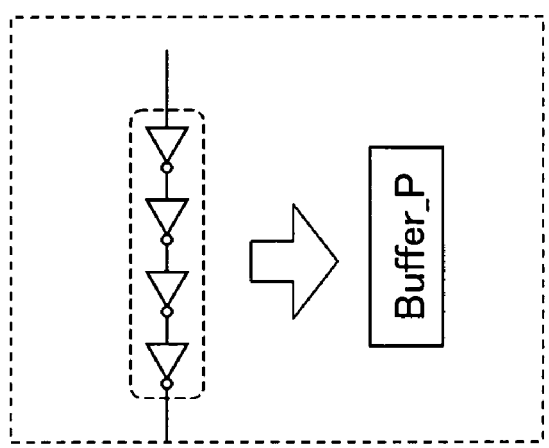
FIG. 18 is a circuit diagram showing one example of a buffer circuit of the superimposition preventing section.

Each buffer circuit Buffer_Pn is provided for making the input signal be subjected to current amplification. This buffer circuit is, for example, a buffer made up of plural (four in this example) inverter circuits which are cascade connected as shown in FIG. 18. Output signals of the buffer circuits Buffer-P1, Buffer-P2, . . . are output signals DSR1, SR1, . . . . The output signal of each buffer circuit Buffer_Pn is inputted to the corresponding switch P_ASWn.

The superimposition removing circuit is provided for removing from the timing pulse as inputted to the switch V_ASWn, a part superimposed with the pre-charge pulse to be inputted to the switch P_ASWn. With this structure, even when adopting the output of the flip flop in which the rear edge (fall) of the pre-charge pulse is in sync with the front edge (rise) of the timing pulse, the rear edge of the pre-charge pulse would not be overlapped with the front edge of the timing pulse, and it is therefore possible to surely prevent such problem that a pair of the sampling switch V_ASWn and the pre-charge switch P_ASWn provided in each data signal line SLn conduct at the same time, which causes a collision between the video signal VIDEO and the pre-charge potential PVID in the data signal line SL.

Further, by defining the front edge of the timing pulse by the rear edge of the corresponding pre-charge pulse, the rear edge of the timing pulse may be also partially cut off depending on an amount of displacement of the rear edge of the pre-charge pulse, and in this case, it is also possible to prevent the superimposition between the timing pulses.

In the present embodiment, for the superimposition preventing circuit, the nor circuits NOR1, NOR2, . . . are adopted, and to these nor circuits NOR1, NOR2, . . . , inputted are the output signals QB1, QB2, . . . , of the flip flop SRFF2, SRFF3, . . . , which are timing pulses, and the output signals DSR1, SR1, SR2, . . . of the buffer circuits Buffer-P1, Buffer-P2, . . . , which are pre-charge pulses.

In the nor circuit NOR1, inputted are the output signal QB1 of the flip-flop SRFF2 and the output signal DSR1 of the buffer circuit Buffer-P1. In the nor circuit NOR2, inputted are the output signal QB2 of the flip-flop SRFF3 and the output signal SR1 of the buffer circuit Buffer-P2.

The output signals of the NOR circuits NOR1, NOR2, . . . are output signals OUT1, OUT2, . . . respectively. The output signal of each nor circuit NORn is inputted to the corresponding buffer circuit Buffer-S1, Buffer-S2.

Figure 2:
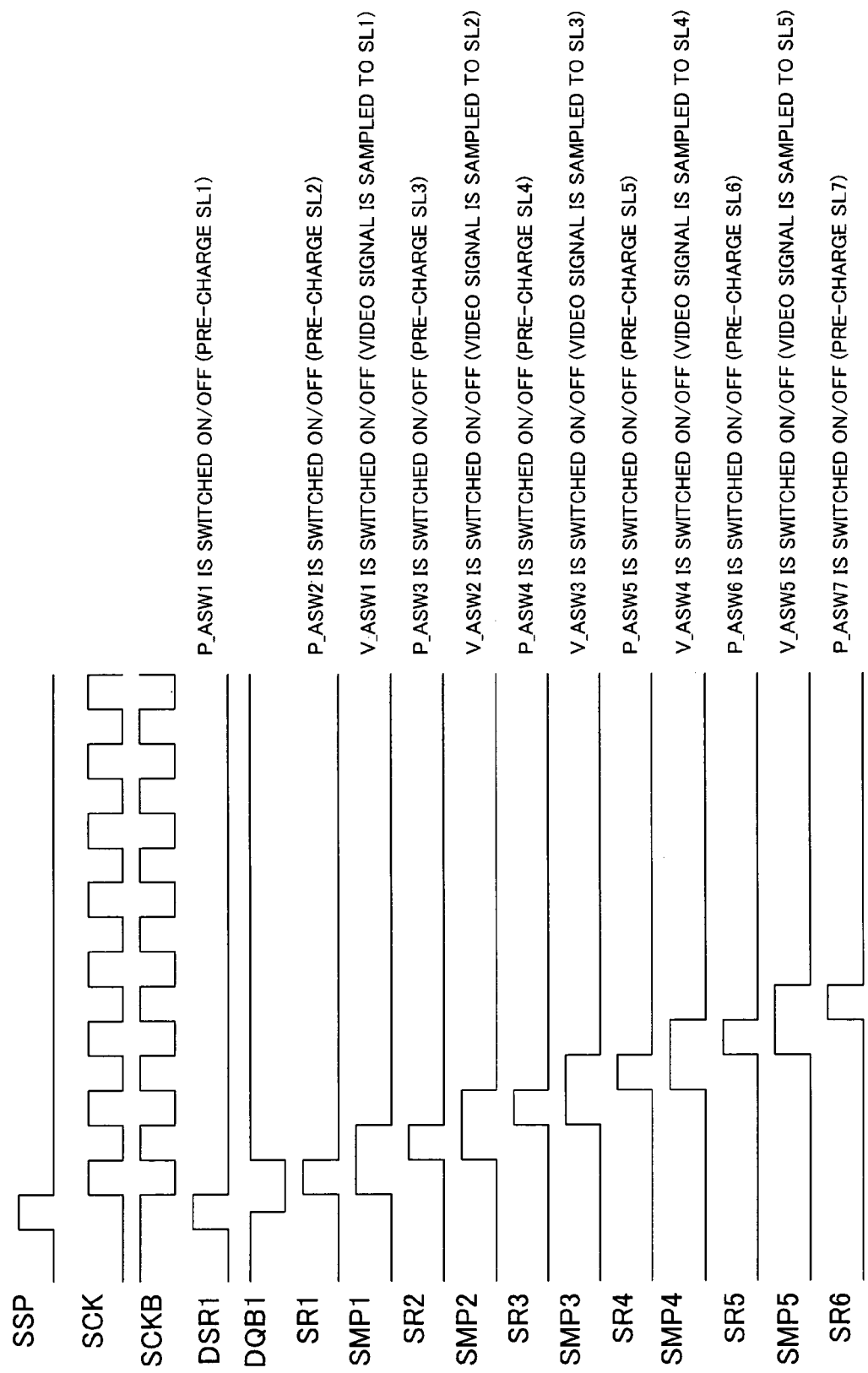
FIG. 2 is a timing chart of signals regarding the operation of the data signal line driver of FIG. 1.
Figure 3:
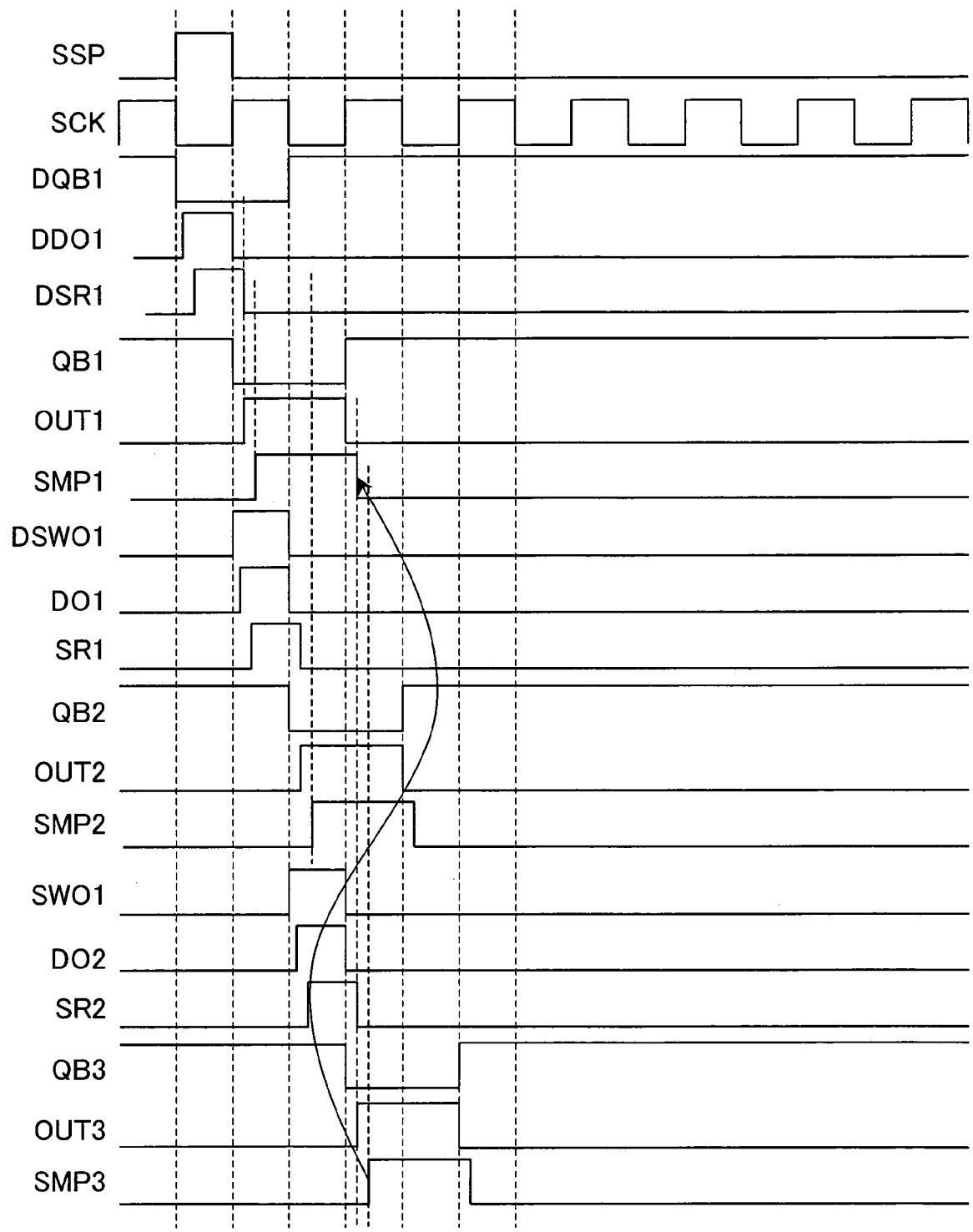
FIG. 3 is a more detailed timing chart of signals regarding the operation of the data signal line driver of FIG. 1.

The following will explain an operation of the data signal line driver having the foregoing structure with reference to the timing charts of FIG. 2 and FIG. 3. The explanations will be given for one period in which a prescribed scanning signal line GLm is selected.

With an input of the start pulse SSP, the first stage flip-flop SRFF1 is set, and the first stage filp-flop SRFF1 outputs an output signal DQB1. The start pulse SSP becomes the output signal DSR1 via the delay circuit Delay_P1 and the buffer circuit Buffer_P1 to be inputted to the switch P_ASW1. As a result, the analog switch of the switch P_ASW1 conducts (hereinafter, described as the switch is set in the conductive state or in the non-conductive state), and the pre-charge potential PVID is applied to the data signal line SL1, thereby pre-charging the data signal line SL1 and the capacitance of the pixel as selected. Here, as the nor circuit NOR1 is provided, the switch V_ASW1 can be surely set in the non-conductive state, and a collision between the pre-charge potential PVID and the video signal VIDEO in the data signal line SL1 can be prevented.

On the other hand, in the shift register 31a, with an output signal DQB1 from the first stage flip flop SRFF!, the switch circuit ASW1 conducts, and the switch circuit ASW1 receives the clock signal SCK and outputs the output signal DSWO1. With an input of the output signal DSWO1, the second stage flip-flop SRFF2 is set, and second stage flip-flop SRFF2 outputs the output signal QB1. This output signal QB1 becomes the output signal SMP1 via the nor circuits NOR1 and the buffer circuit Buffer-S1, and makes the switch V_ASW1 conduct. As a result, the video signal VIDEO is supplied to the data signal line SL1, and the data signal line SL1 and the pixel capacitance are charged to a predetermined amount of charge. Namely, the effective sampling period (effective writing period) starts in which the sampling of the video signal VIDEO is carried out, and respective data signal lines in the predetermined period are sequentially subjected to sampling. Here, the start pulse SSP can be surely set in the Low level, and the switch P_ASW1 can be set in the non-conductive state, and a collision between the pre-charge potential PVID and the video signal VIDEO in the data signal line SL1 can be prevented.

The output signal DSWO1 becomes an output signal SR1 via the delay circuit Delay_P2 and the buffer circuit Buffer_P2, to be inputted to the switch P_ASW2. As a result, the analog switch P_ASW2 conducts, and thus the video signal VIDEO is outputted to the data signal line SL1, at the same time, the data signal line SL2 and the pixel capacitance are pre-charged.

In the shift register 31a, with an input of the output signal QB1, the switch ASW2 conducts, and receives a clock signal SCKB and outputs the output signal SWO1.

This output signal SWO1 serves as a set signal of the flip-flop SRFF3 and a reset signal of the flip-flop SRFF1, and thus the output signal DQB1 of the SRFF1 becomes Low level. As a result, the switch ASW1 is set in the non-conductive state.

As described, the dot-sequential sampling is performed by repetitively carrying out the process of supplying a video signal VIDEO to the data signal line SLn after pre-charging the data signal line SLn, and pre-charging the data signal line SL (n+1) while the video signal VIDEO is being supplied. The foregoing operation is based on the operation of sequentially transferring the timing pulse by the flip-flop SRFFk and the switch circuit ASWk in the latter stage in the shift register 31 to the flip-flop SRFF. As shown in FIG. 2, adjacent sampling periods are overlapped by a half period of the clock signal SCK, SCKB. In this case, the sampling potential is determined by the pixel capacitance and the charge potential of the data signal line at a fall (rear edge) of the timing pulse in each sampling period.

FIG. 3 shows a more detailed timing chart. The start pulse SSP which serves as a pre-charge pulse for pre-charging the data signal line SL in the 1st line is inputted to the delay circuit Delay_P1 where the front edge thereof is cut off to be the output signal DDO1. The output signal DDO1 is inputted to the buffer circuit Buffer_P1 where this signal DDO1 is further delayed in timing for a predetermined time to be outputted as the output signal DSR1. With an input of this output signal DSR1, the switch P_ASW1 conducts, and the data signal line SL1 is pre-charged with the pre-charge potential PVID. The output signal DSR1 is also inputted to the nor circuit NOR1 which is supplied with the output signal QB1 serving as a timing pulse for sampling the video signal VIDEO in the data signal line SL in the 1st line. The output OUT1 from the nor circuit NOR1 is regulated while the output signal DSR1 is in the High level, and becomes High level only after the output signal DSR1 becomes Low level. The output signal OUT1 is inputted to the buffer circuit Buffer_S1 where the signal OUT1 is delayed in timing for a predetermined time to be the output signal SMP1. With an input of this signal SMP1, the switch V_ASW1 conducts, and the video signal VIDEO is inputted in the data signal line SL1.

As is clear from FIG. 3, the output signal SMP1 rises only after the fall of the output signal DSR1 which is the final pre-charge pulse. It is therefore possible to surely prevent a collision between the pre-charge potential PVID and the video signal VIDEO in the data signal line SL1. It is possible to also prevent a collision between the output signal SR1 and the output signal SMP2, and a collision between the output signal SR2 and the output signal SMP3.

In view of the fall of the pulse of the output signal SMP1 and the rise of the pulse of the output signal SMP3, the respective pulses are not overlapped. Namely, by regulating the rise (front edge) of the pulse of the subsequent output signal SMP3 after the fall of the output signal SR2 which serves as the pre-charge pulse, the front edge of the pulse of the output signal SMP3 is partially cut off. With this structure, a superimposition between the pre-charge pulse and the timing pulse can be prevented, and at the same time, a superimposition between the timing pulses can be prevented.

To eliminate the superimposition between the timing pulses, it is desirable to adopt the structure which permits the front edge of the timing pulse to be surely cut off, i.e., it is desirable that the rear edge of the final pre-charge pulse to be inputted to the nor circuit NOR is overlapped with the front edge of the timing pulse.

In the present embodiment, the output signal DDO1 and DO1 from the delay circuit Delay_P is subjected to delay in the buffer circuit Buffer_P for current amplifying the pre-charge pulse. Therefore, the rear edge of the output signal DSR1 and the SR1 outputted from the buffer circuit Buffer_P, which is a final pre-charge pulse is effectively overlapped with the front edge of the output signal QB1, QB2, and it is therefore possible to surely cut off the front edge of the timing pulse. Incidentally, although the delay circuit Delay_P is designed to minimize the delay in the rear edge of the signal, a delay resulting from passing through the circuit always occurs. Therefore, it can be said that not only a delay in the Buffer-P but also a delay in the delay circuit Delay_P contribute for the elimination of the superimposition between timing pulses.

Furthermore, if a delay in the pre-charge pulse to be inputted to the nor circuit NOR is not sufficient to prevent the superimposition of the timing pulses by cutting off the front edge of the timing pulse, the inverter circuit for delay may be added in the pre-stage of the delay circuit Delay_P or in the pre-stage of the buffer circuit Buffer_P, or the inverter circuit for delay may be added in the output line for inputting the output signal DSR1, SR1, SR2 . . . from the buffer circuit Buffer_P to the nor circuit NOR.

Incidentally, in the case where the front edge of the pre-charge pulse or the timing pulse is overlapped with the rear edge of the timing pulse, a display quality is significantly affected. Namely, the front edge of the pulse indicates the open of the switch P_ASW or the switch V_ASW. Specifically, in the case where the switch P_ASW and the V_ASW switch are open, the data signal line SL is not charged to a sufficient level, and thus significant variations in potential occur in the capacitance generated with the data signal line S when opening the switches P_ASW and V_ASW. Therefore, the delay circuit Delay_P is provided with the function of preventing the superimposition between the front edge of the pre-charge pulse and the rear edge of the timing pulse in addition to the function of preventing the superimposition between the front edge of the pre-charge pulse and the rear edge of the timing pulse.

As can be seen from FIG. 3, according to the structure of the data signal line driver 31, the respective front edge of the output signal DSR1, SR1 serving as the pre-charge pulse is delayed, the superimposition between the pre-charge pulses can be avoided, and it is therefore possible to surely prevent such problem that a data signal line which is not supposed to be charged is pre-charged, which may result in insufficient driving performance of the pre-charge potential PVID, and in the meantime, the data signal lines SL can be surely charged line by line.

The described effective sampling period indicates a period after the sampling is started till the completion of the sampling by the data signal line driver SL in the last stage, the pre-charge of the data signal line which is not in the sampling period in this effective sampling period is carried out in the following manner. That is, the switch circuit ASWk receives the clock signal SCK, SCKB from the different supply from that of the timing pulse and outputs the clock signal SCK, SCKB, and the control terminal (gate G') is charged, to conduct the switch P_ASWn (n=k+1). In the structure of the present embodiment, the foregoing pre-charge is performed in the effective sampling period, and the total number of switch circuits ASWk is therefore set to the number of data signal lines SL to be pre-charged in the effective sampling period. For the pre-charge to be carried out outside the effective sampling period (pre-charge of the data signal line LS1, for example), the foregoing switch circuits are not always necessary.

Here, while the sampling of the video signal VIDEO is being carried out with respect to a prescribed data signal line SL, another data signal line SL can be pre-charged. Here, the supply line for supplying the timing pulse for sampling is provided separately from the supply line for supplying pre-charge signal, and a signal control circuit is not used in common between the switch V_ASW and the switch P_ASW. It is therefore possible to prevent such problem that a large amount of current flowing in the data signal line SL due to the pre-charge causes fluctuatuations in the potential of the video signal VIDEO of the data signal line SL signal to which a write signal is being inputted via the capacitive control terminal (gate G') of the switch P_ASW.

Second Embodiment

Figure 4:
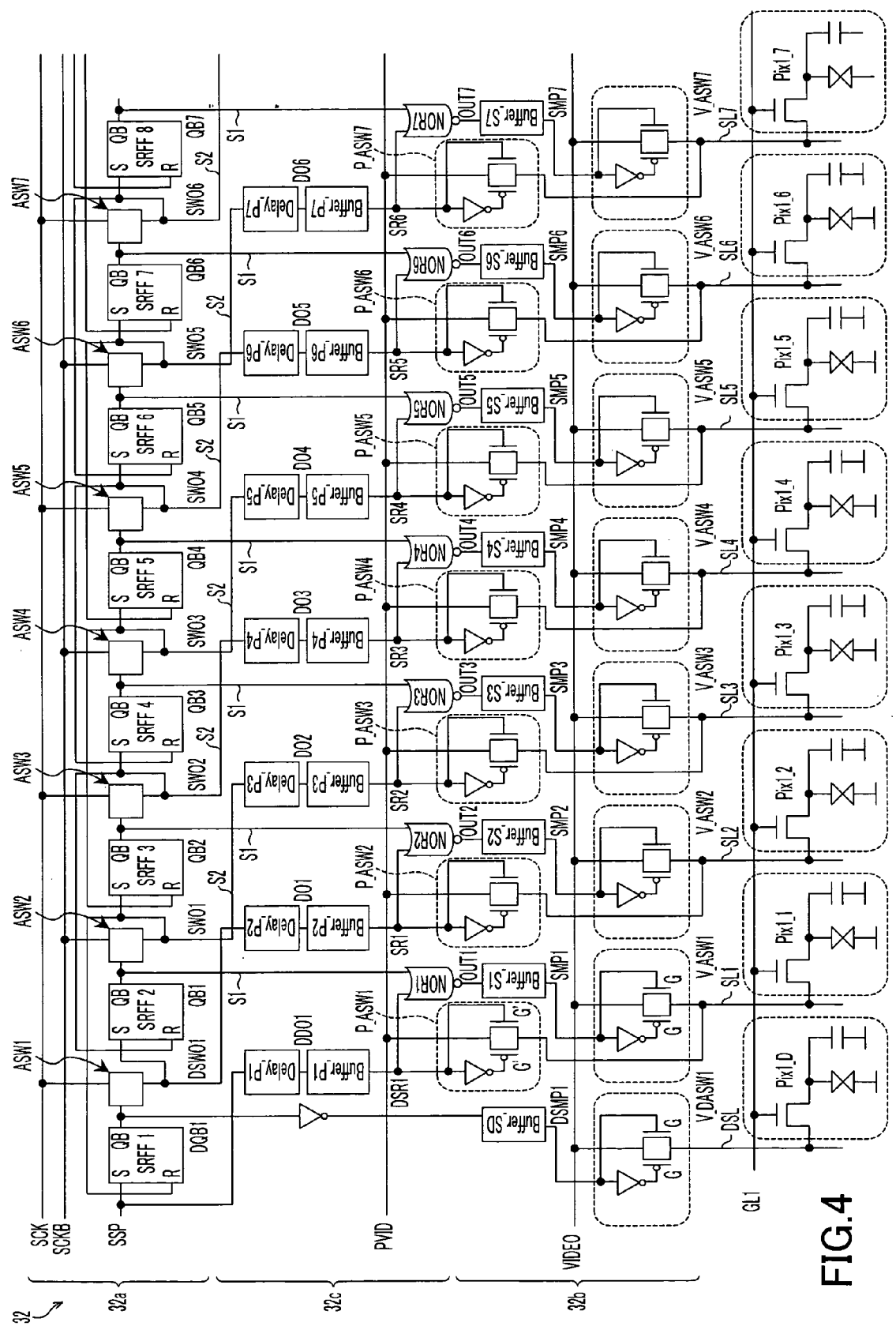
FIG. 4 is a circuit block diagram showing the structure of a data signal line driver in accordance with the second embodiment of the present invention.
Figure 5:
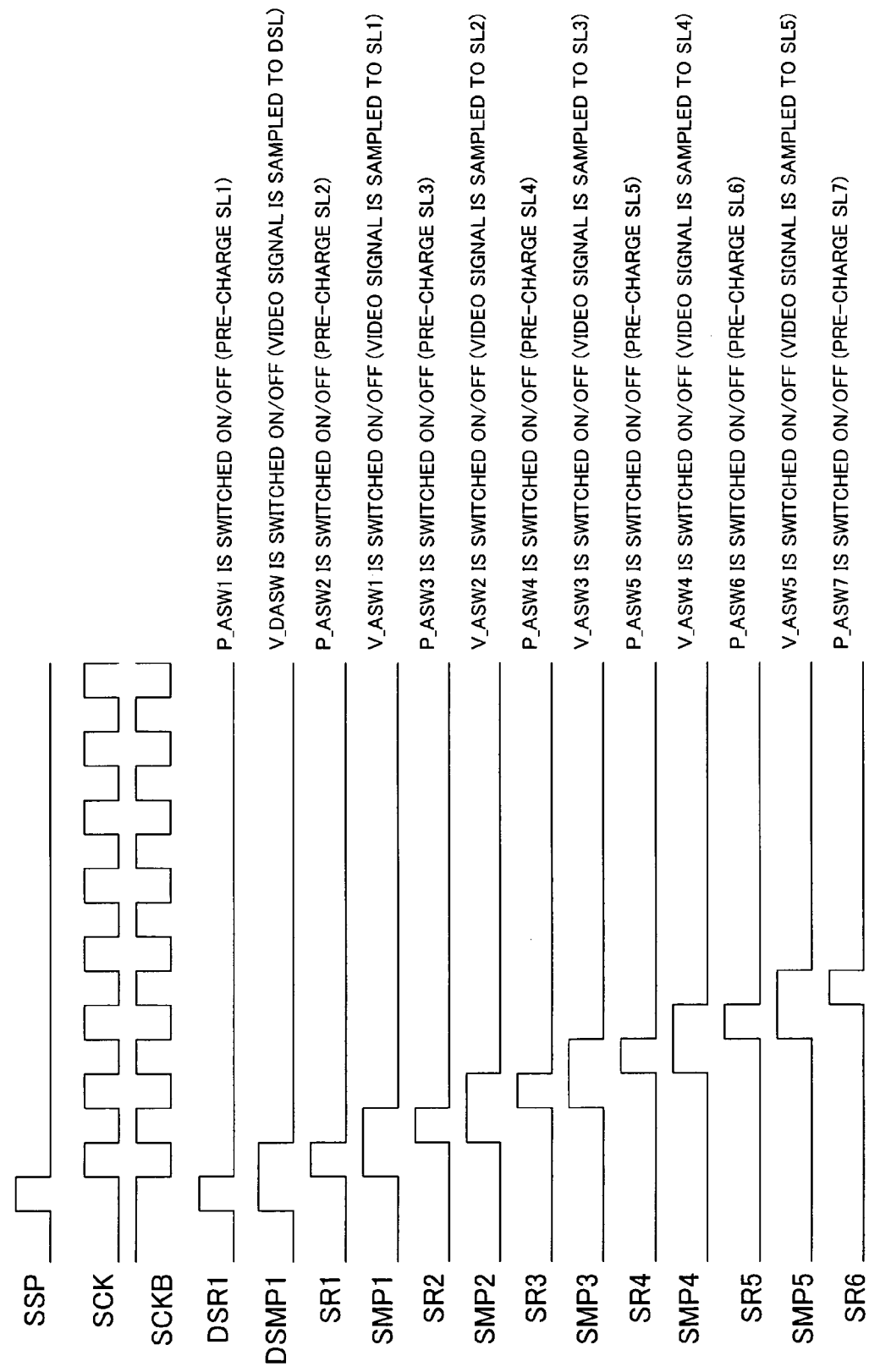
FIG. 5 is a timing chart of signals regarding the operation of the data signal line driver of FIG. 4.

The following will explain another embodiment of the present invention with reference to FIGS. 4 and 5. For ease of explanation, members having the same functions as those shown in the drawings pertaining to the first embodiment will be given the same reference symbols, and explanation thereof will be omitted here. In the present embodiment, explanations will be given only for the structure different from that of the first embodiment.

A driver circuit of a display apparatus in accordance with the present embodiment is a data signal line driver of a liquid crystal display apparatus. FIG. 4 shows the structure of a data signal line driver 32.

The data signal line driver 32 includes a shift register 32a, a sampling section 32b and a superimposition preventing section 32c.

The respective structures of the shift register 32a and the superimposition preventing section 32c are the same as the shift register 32a and the superimposition preventing section 32c of FIG. 1, and only the sampling section 32b is different in structure from the sampling section 31b of FIG. 1.

Specifically, in the sampling section 31b of FIG. 1, on the input side of the 1st data signal line SL1, provided is a dummy data signal line DSL connected to a dummy pixel Pixm-D (m=1, 2, . . . , n=1, 2, . . . ), and the buffer circuit Buffer-SD is also provided corresponding to the dummy data signal line DSL. In the structure of the present embodiment, the output signal DQB1 from the first flip flop SRFF1 which is not in use in the shift register 31a of FIG. 1 is inputted to the buffer circuit Buffer-SD via the inverter circuit.

The data signal line driver 32 of the foregoing structure is suitably applied to the driver circuit of the display apparatus provided with a dummy data signal line and a dummy pixel.

Incidentally, such dummy pixel is generally provided under a shielding member called "black matrix", and a display of the pixel does not appear in the display. It is therefore not necessary to pre-charge the dummy pixel and the data signal line DSL.

FIG. 5 is a timing chart showing the operation of the data signal line driver 32 of the foregoing structure. The signal transmission principle of the data signal line driver 32 is the same as that of FIG. 1, and the detailed explanations thereof will be omitted here.

Figure 6:
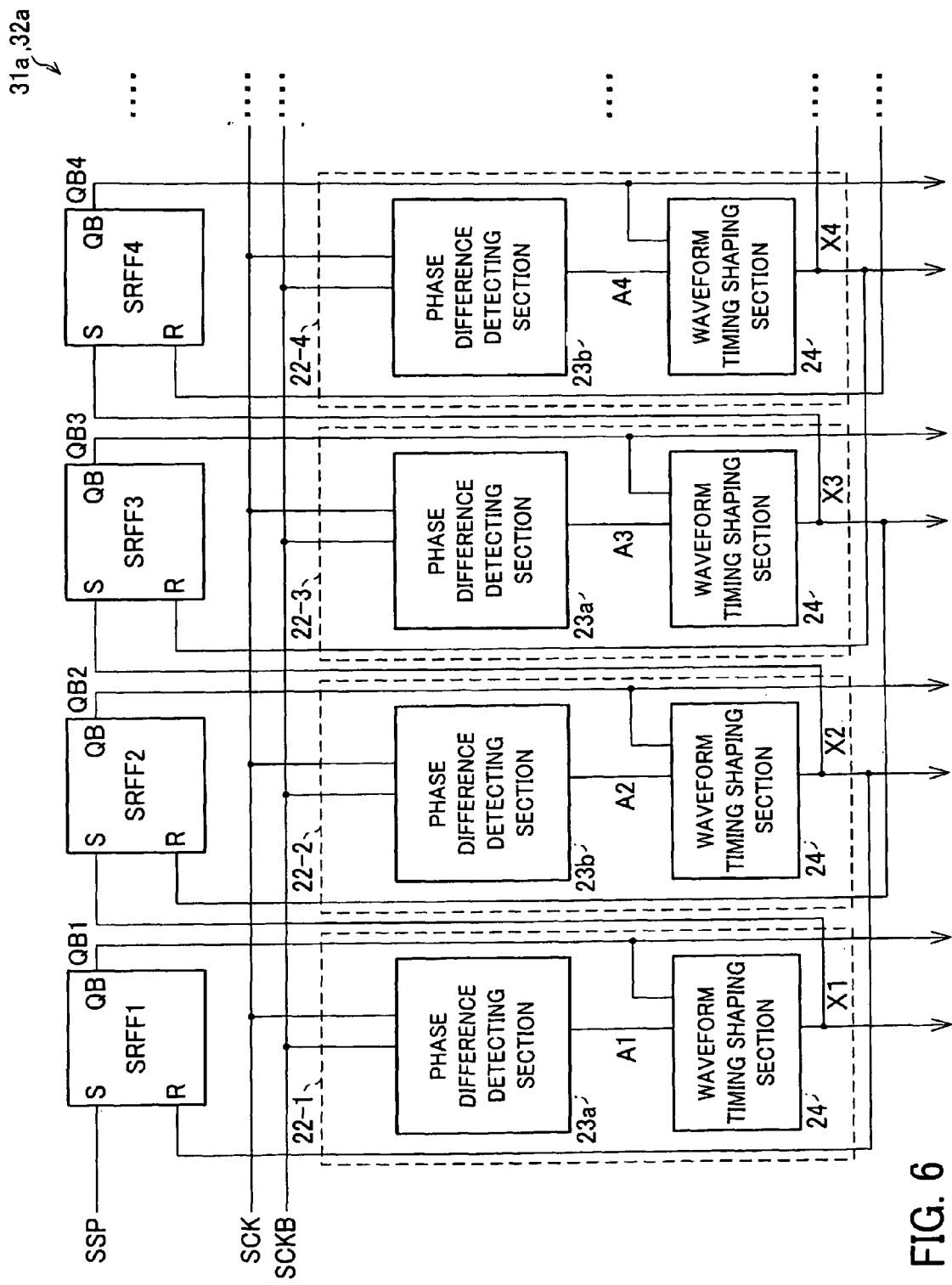
FIG. 6 is a circuit block diagram showing an arrangement of a data signal line driver provided with a pulse signal supply circuit of another structure in replace of the switch circuit.

The data signal line drivers 31 and 32 in the first and second embodiments which are the data signal line driver circuits may be arranged such that the switch circuits ASW1 and ASW2 of the shift registers 31a and 32a are provided with the shift registers 31a' and 32a' which are made up of the input control circuit 22 provided with the phase difference detecting section 23 and the waveform timing shaping section 24 shown in FIG. 6.

The phase difference detecting section 23 generates a superimposition cut off clock signal by eliminating from the waveform of the clock signal (SCK or SCKB) to be inputted to the flip flop SRFF in the next stage, the part superimposed with the waveform of another clock signal (SCKB or SCK). Here, the phase difference detection signal 23 detects the waveform of the clock signal SCK and the clock signal SCKB, and a waveform in which the clock signal SCK and the clock signal SCKB are not superimposed is extracted to be a new clock signal (superimposition cut-off signal).

The phase difference detecting sections 23 generate different clocks between odd numbered stage phase difference detecting sections 23a and even numbered stage phase difference detecting sections 23b. The odd numbered stage phase difference detecting sections 23a output signals A1, A3, ... as odd-numbered clock signals. The output signals A1, A3, ... are signals obtained by eliminating from the clock signal SCK, a deviated part in which the clock signal SCK and the clock signal SCKB are both in the High level. The even numbered stage phase difference detecting sections 23b output signals A2, A4, ... as even-numbered clock signals. The output signals A2, A4, ... are signals obtained by eliminating from the clock signal SCKB, a deviated part in which the clock signal SCK and the clock signal SCKB are both in the High level. By generating a new clock signal in the foregoing manner, the respective High level periods of output signals A1 and A3 which are clock signals for odd-numbered stages are not overlapped with each other. Similarly, the respective High level periods of the output signals A2, A4 which are clock signals for even-numbered clock signals are not overlapped with each other.

Each of the waveform timing shaping sections 24 generates an output signal X (X1, X2) by extracting the period in which an output signal A (A1, A2, A3 . . . ) which is a new clock signal generated by the corresponding phase difference detecting section 23 in the period in which the output signal QB of the corresponding flip flop SRFF is in the Low level. The waveform timing shaping sections 24 in the odd-numbered stages and in the even-numbered stages have the same structure. The output signal X (X1, X2) of the waveform timing shaping section 24 is a set signal of the flip-flop SRFF in the next stage, and is inputted in replace of the output signal DSWO1, SWO1, to the delay circuit Delay_P2, Delay_P3, which is the pulse front edge removing circuit of the superimposition preventing sections 31c and 32c of FIG. 1 or FIG. 4. Incidentally, the output signal X (X1, X2, ... ) is inputted to the flip flop SRFF in the previous stage as a reset signal, to reset the flip flop SRFF in the previous stage.

By adopting the foregoing shift register 31a', 32a' provided with the input control section 22, even when a phase deviation occurs in the clock signal SCK, SCKB, and a period in which the clock signals SCK and SCKB are superimposed exists, it is possible to operate the shift register made up of the set reset flip flops SRFF without operation errors.

Third Embodiment

The following will explain a still another embodiment of the present invention with reference to FIGS. 7, 8 and 19 to 21. For ease of explanation, members having the same functions as those shown in the drawings pertaining to first and second embodiments will be given the same reference symbols, and explanation thereof will be omitted here.

Figure 7:
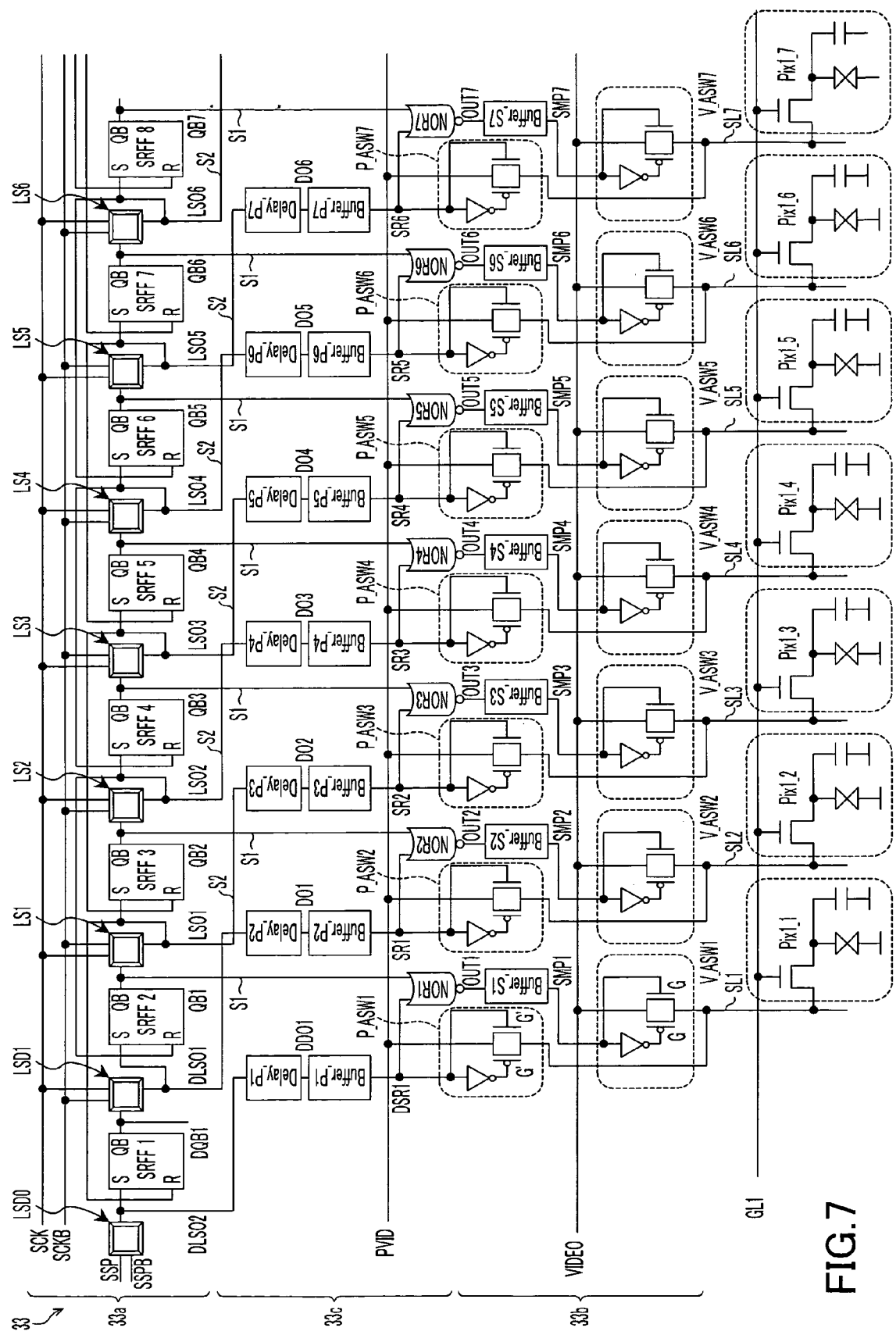
FIG. 7 is a circuit block diagram showing the structure of a data signal line driver provided with a pulse signal supply circuit of another structure in replace of the switch circuit.

A driver circuit of the display apparatus in accordance with the present embodiment is a data signal line driver of a liquid crystal display apparatus. FIG. 7 shows the structure of a data signal line driver 33.

The data signal line driver 33 includes a shift register 33a, a sampling section 33b and a superimposition preventing section 33c.

The respective structures of the superimposition preventing section 33c and the sampling section 33b are the same as the superimposition preventing section 31b and the sampling section 31b of FIG. 1, and only the shifter register 33a is different in structure from the shift register 31a of FIG. 1.

Specifically, the shift register 33a includes flip-flops SRFFk (k=1, 2, ... ) and level shifter circuits LSD0, LSD1, LS1, LS2, . . . . These level shifter circuits LSD1, LS1, LS2, ... are provided in replace of the switch circuits ASW1, ASW2, ASW3 ... of FIG. 1 respectively. The respective structures of the level shifter circuits LSD1, LS1, LS2, ... are the same. With an input of QB output of the flip flop, each level shifter circuit receives the clock signal SCK, SCKB, and carries out a level shifting based on these signals. Specifically, the level shifter circuits LSD1, LS2, LS4, ... , level shift the waveform of a clock signal SCK, and the level shifter circuits LSD0, LS1, LS3, ... level shfit the waveform of a clock signal SCKB. The level shifter circuits LSD1, LS1, LS2, ... are then output signals DLSO1, LSO1, and LSO2, . . . (pre-charge pulse) as a result of level shifting. Each of these output signals serves as a set signal of the flip flop in the next stage.

The level shifter circuit LSD0 in the first stage receives start pulses SSP, SSPB, and level shifts the start pulse SSP to be inputted to the first stage flip flop. The start pulse SSPB is an inversed signal of the start pulse SSP. The level shifter circuit LSD0 outputs the output signal DLSO2 obtained by level shifting the start pulse SSP.

The data signal line driver 33 in accordance with the present embodiment is suitably applied to a driver circuit of a display apparatus in which a voltage level of such signals as the clock signals SCK, SCKB, or start pulse signal SSP externally supplied is low.

The internal structure of the superimposition preventing section 33c is the same as the internal structure of the superimposition preventing section 31c of FIG. 1. Similarly, the internal structure of the sampling section 33b is the same as the internal structure of the sampling section 31b of FIG. 1. Therefore, output signals DLSO2, DLSO1, LSO1, LSO2, ... of the shift register 33a sequentially become output signals DSR1, SR1, SR2, ... via the delay circuits Delay_P1, Delay_P2, Delay_P3, ... and buffer circuits Buffer_P1, Buffer_P2, Buffer_P3, . . . and become input signals of the switches P_ASW1, P_ASW2, P_ASW3 . . . . These output signals DSR1, SR1 and SR2 are inputted to the corresponding NOR circuits NOR1, NOR2, . . . . The data signal line SLn (n=1, 2, . . . ), the scanning signal lines GLm (m=1, 2, . . . ), the and pixels Pixm_n (m=1, 2, . . . , n=1, 2, . . . ) are the same as those shown in FIG. 1.

Figure 19:
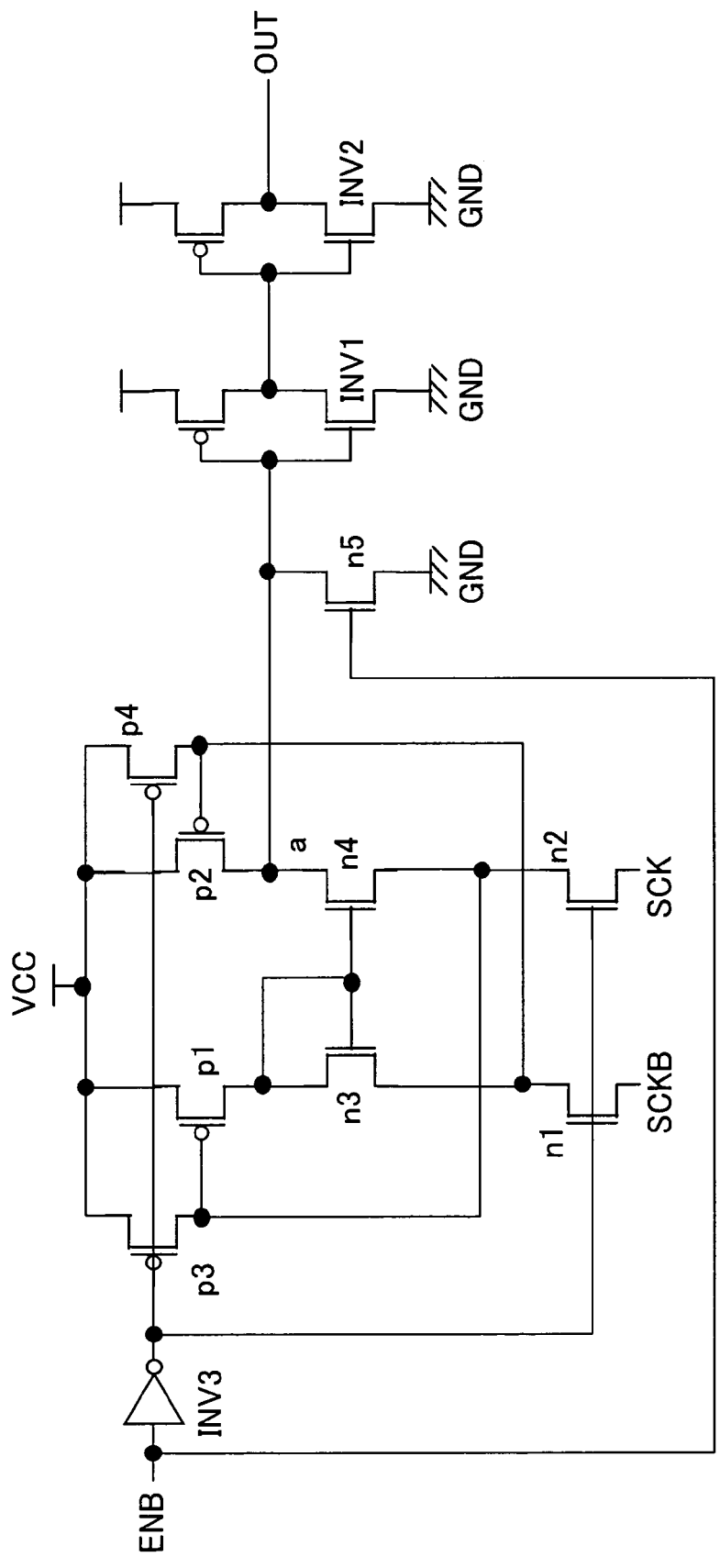
FIG. 19 is a circuit diagram showing the structure of one example of the level shifter circuit.

Here, an example structure of the shift register circuit applicable to the level shifter circuits LSD0, LSD1, LS1, LS2, . . . will be explained in reference to FIG. 19. FIG. 19 shows a circuit diagram showing one example structure of the level shifter circuit.

When the control signal ENB externally supplied becomes Low level, the shift register circuit receives clock signals SCK, SCKB from an external section, and outputs an output signal OUT obtained by level shifting the clock signal SCK as an output signal. The control signal ENB corresponds to the QB output of the flip flop of FIG. 7. Incidentally, the output signal OUT corresponds to the output signal DSLO1, LSO1, LSO2, . . . of FIG. 7.

Incidentally, in the case where the level shifter circuit is the level shifter circuit LSD0, the level shifter circuit LSD0 receives a start pulse SSP, SSPB in replace of the clock signal SCK, SCKB, and outputs an output signal OUT obtained by level shifting the clock signal SSP.

The level shifter circuit of FIG. 19 is controlled according to a control signal ENB as externally supplied, and the level shifter circuit starts operating when the control signal ENB is in the Low level. The level shifter circuit in accordance with the present embodiment always outputs an output signal OUT in the Low level when the control signal ENB is in the High level.

Figure 20:
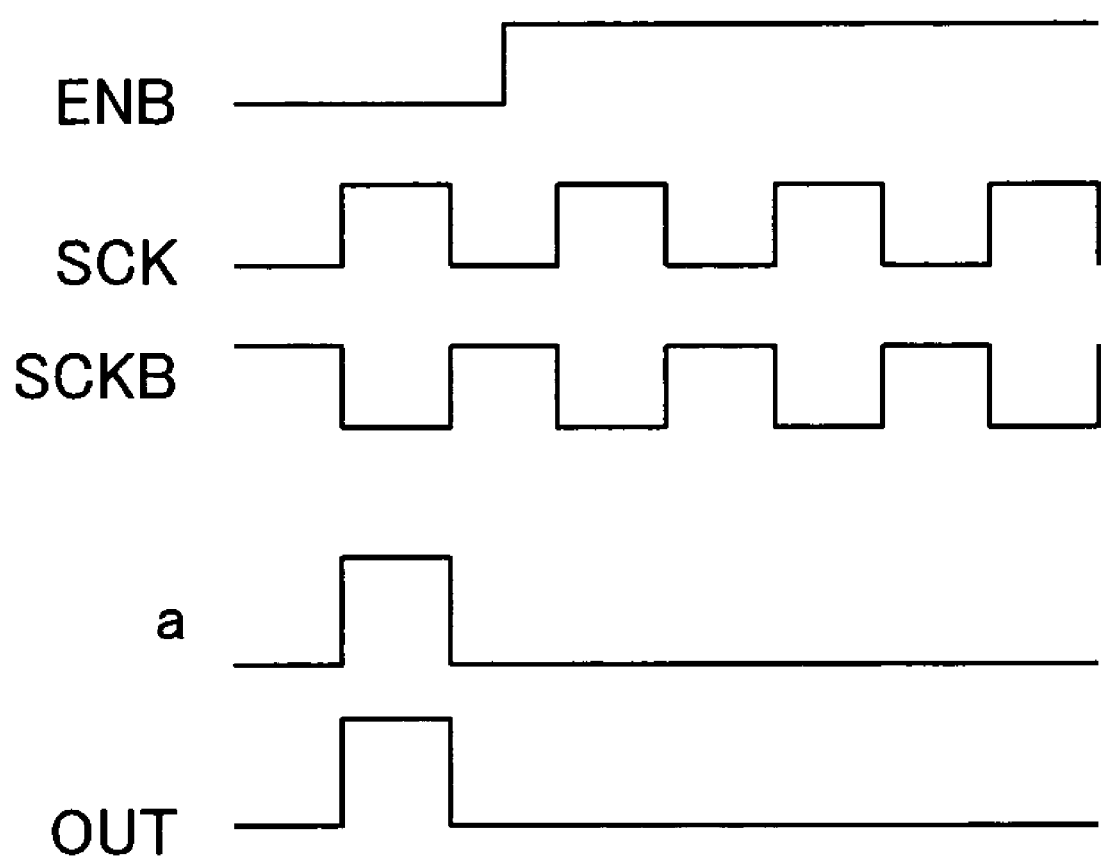
FIG. 20 is a timing chart showing respective waveforms of an input signal, a node signal and an output signal in the level shifter circuit of FIG. 19.

The operation of the level shifter circuit is explained in reference to signals shown in FIG. 19 and the timing chart of FIG. 20. FIG. 20 is a timing chart showing respective waveforms of an input signal, a node signal and an output signal.

As shown in the timing chart of FIG. 20, when the control signal ENB becomes low level, and the clock signal SCK becomes High level, in response to an inversed signal of the control signal ENB as inversed by the inverter circuit INV3, the p-channel MOS transistors p3 and p4 are closed, and the n-channel MOS transistors n1 and n2 are opened. In this state, by the p-channel MOS transistors p1 and p2 and the n-channel MOS transistors n3 and n4, to the node a, a signal in the High level is inputted via the p-channel MOS transistor p2, and the node a becomes High level. Then, when the clock signal SCK becomes Low level, to the node a, a signal in the Low level is inputted via the n-channel MOS transistor n4, and the node a becomes Low level. The respective states of nodes a (High or Low) are transmitted to an output terminal of the level shifter circuit by the inverter circuits INV1 and INV2, and is outputted as an output signal OUT. This signal appears at the output terminal as a level shifted clock signal SCK. Here, to the gate of the n-channel MOS transistor n5 to which the ENB is connected, a Low level signal is inputted, and the n-channel MOS transistor n5 is therefore closed.

Next, when the control signal ENB becomes High level, in response to an inversed signal of the control signal ENB as inversed by the inverter circuit INV3, the p-channel MOS transistors p3 and p4 are opened, and the n-channel MOS transistors n1 and n2 are closed. In this state, to the respective gates of the p-channel MOS transistors p1 and p2, a power supply voltage VCC is supplied from the power supply VCC via the p-channel MOS transistors p3 and p4. As a result, the p-channel MOS transistors p1 and p2 are closed, and a path of the current that flows from the power supply VCC disappears. To the gate of the n-channel MOS transistor n5 to which the ENB is connected, a High level signal is inputted, and the n-channel MOS transistor n5 is therefore opened, and the node a becomes Low level. As a result, the output signal OUT of the level shifter circuit becomes Low level. With this structure, even when a clock signal SCK with an amplitude of lower potential than the power supply voltage VCC is inputted, the output signal OUT of the level shifter circuit is an output signal in the Low level. In the case where the control signal ENB is in the High level, a path of a current that flows from the power supply VCC disappears, unnecessary power consumption can be suppressed.

Figure 21:
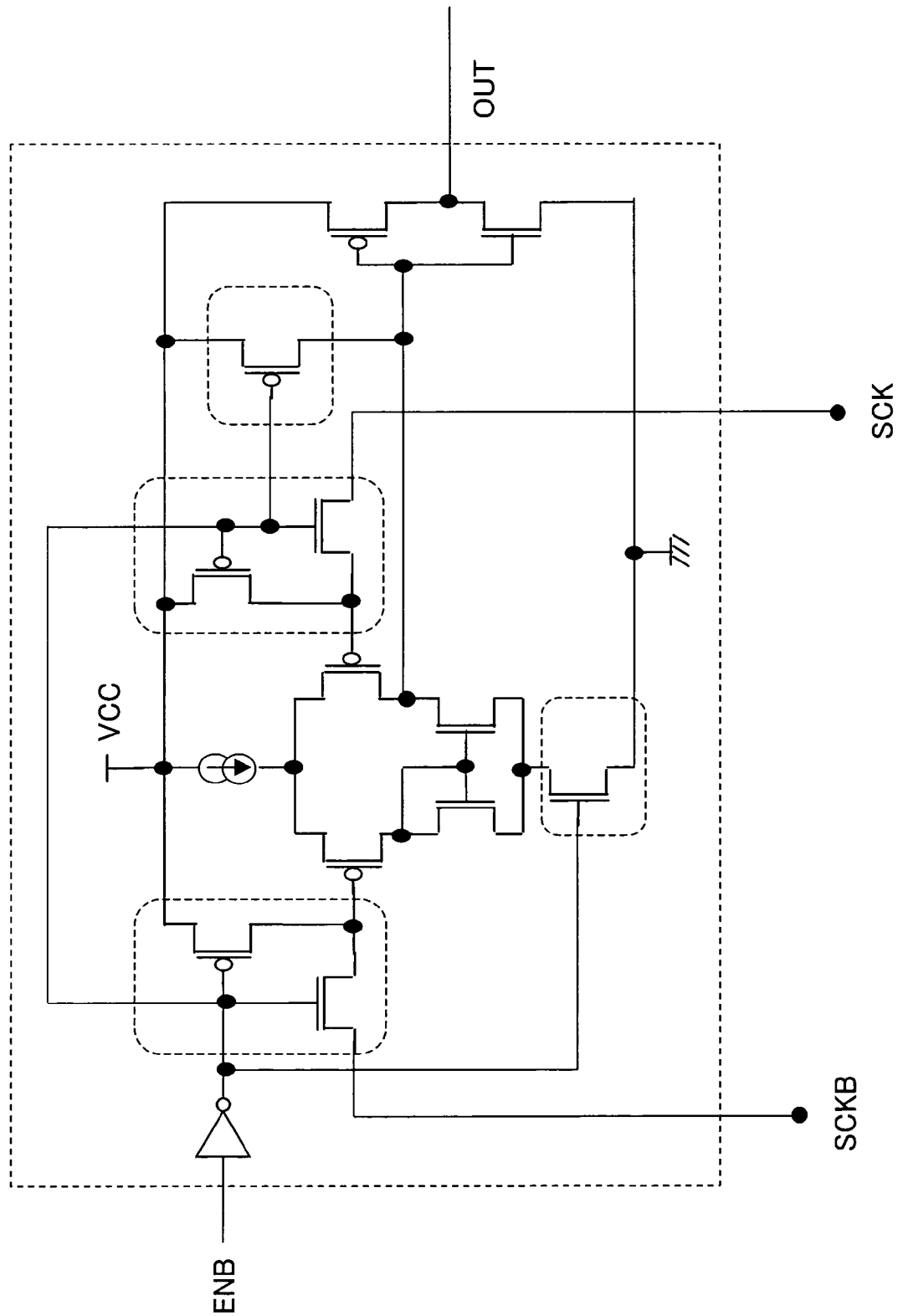
FIG. 21 is a circuit diagram showing the structure of another example of the level shifter circuit.
Figure 22:
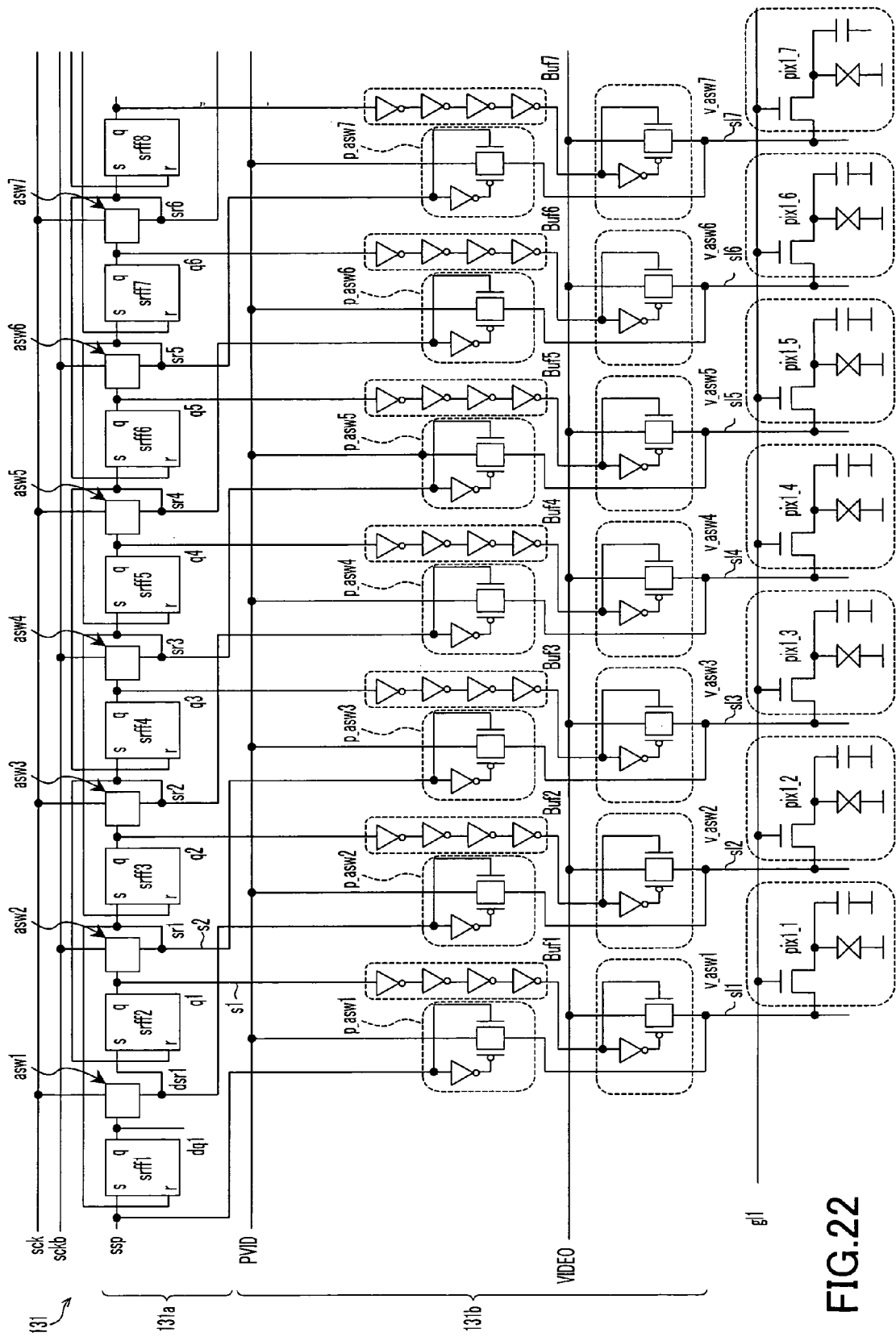
FIG. 22 is a circuit block diagram showing the structure of a conventional data signal line driver.
Figure 23:
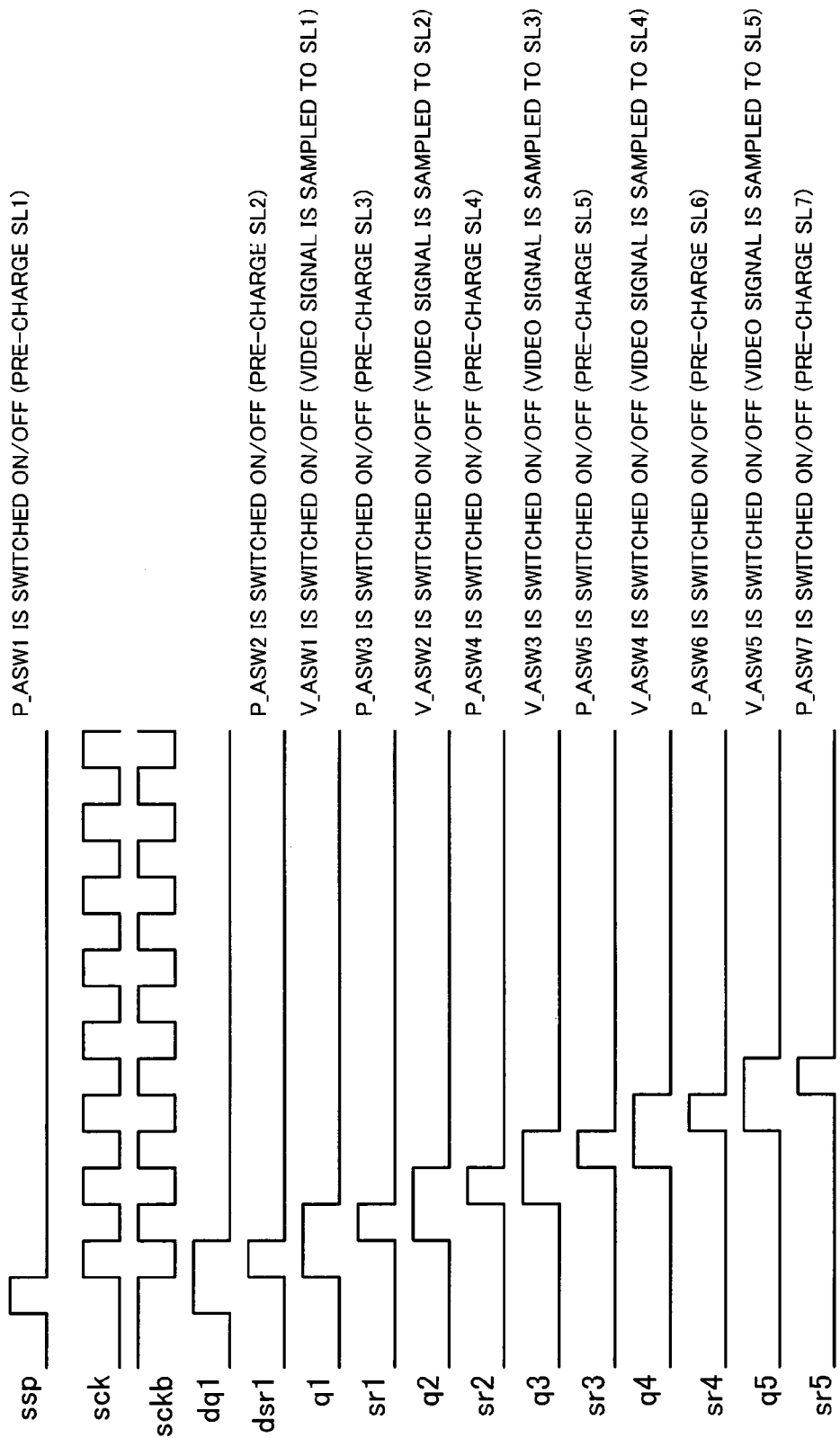
FIG. 23 is a timing chart of signals regarding the operation of the data signal line driver of FIG. 22.

Although explanations will be omitted here, the level shifter circuit having the structure of FIG. 21 offers the same effects as achieved from the level shifter circuit of FIG. 19. FIG. 21 is a circuit diagram showing the structure of one example of another level shifter circuit.

Figure 8:
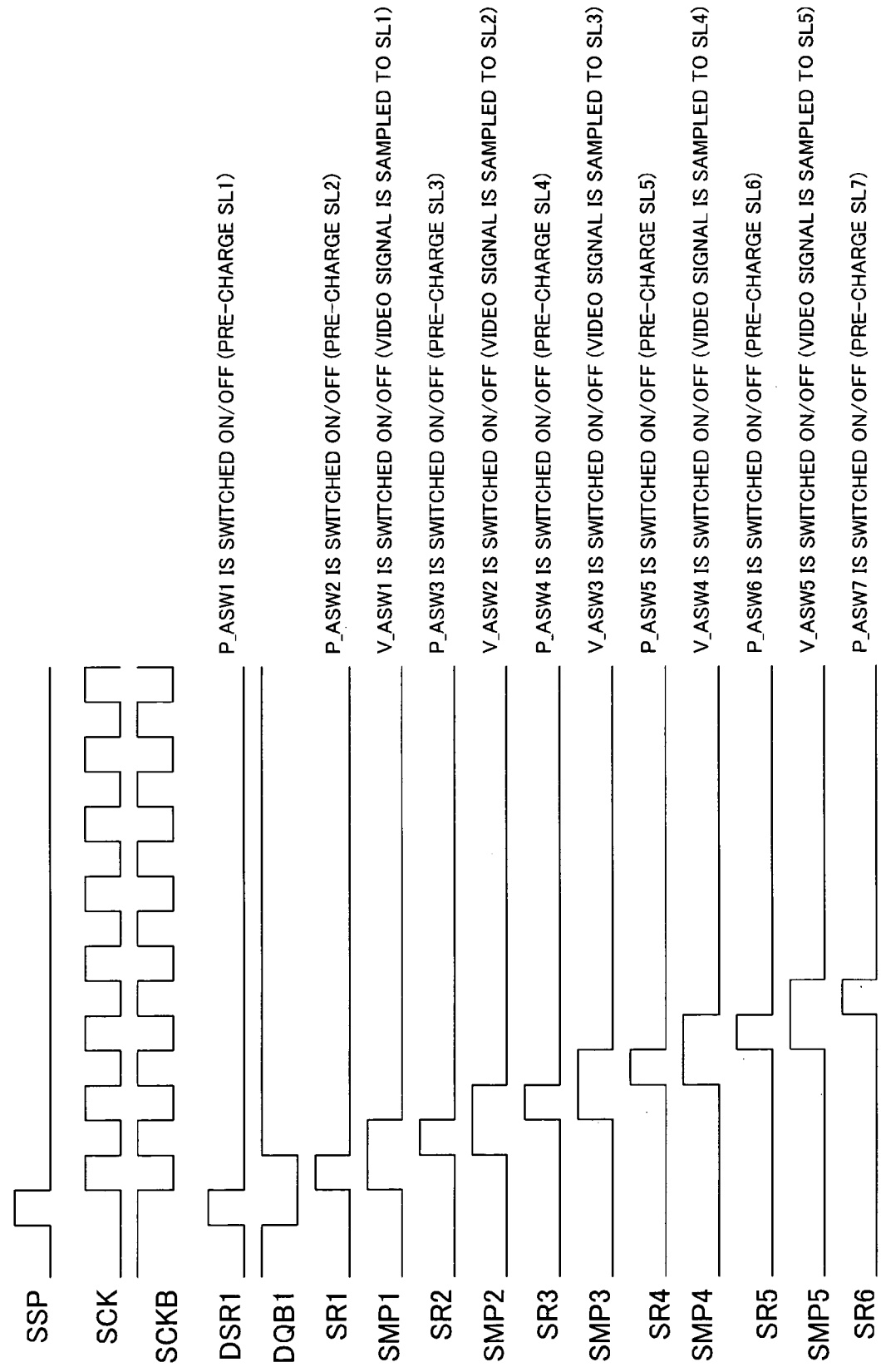
FIG. 8 is a timing chart of signals regarding an operation of the data signal line driver of FIG. 7.

The operation of the data signal driver 33 having the foregoing structure is shown in the timing chart of FIG. 8. When the start pulses SSP and SSPB are inputted, the level shifter circuit LSD0 level shifts these start pulse to be outputted as an output signal DLSO2. Then, the output signal DQB1 is outputted from the flip flop SRFF1, and the start pulse SSP is inputted to the switch P_SW1. As a result, the switch P_ASW1 is conducted, and the pre-charge potential PVID is applied to the data signal line SL1, and the data signal line SL1 and the pixel capacitance of the pixel as selected are pre-charged. In this state also, the switch P_ASW1 is surely set in the non-conductive state by the nor circuit NOR1, and therefore a collision between the potential PVID of the pre-charge signal and the potential of the video signal VIDEO on the data signal line SL1 can be prevented.

With an input of the output signal DQB1, the level shifter circuit LSD1 receives clock signals SCK, and SCKB, and level shifts the clock signal SCK to be outputted as the output signal DLSO1. This output signal DLSO1 serves as a set signal of the flip-flop SRFF2, and the flip-flop SRFF2 outputs an output signal QB1. With an input of the output signal QB1, the level shifter circuit LS1 receives clock signals SCKB and SCK, and level shifts the clock signal SCKB to be outputted as the output signal LSO1. By the output signal QB1, the switch V_ASW1 is conducted via the buffer circuit Buffer_S1 as a timing pulse. As a result, the video signal VIDEO is supplied to the data signal line SL1, and the data signal line SL1 and the pixel capacitance are charged to a predetermined voltage. Namely, the effective sampling period (effective writing period) starts in which the sampling of the video signal VIDEO is carried out, and respective data signal lines in the predetermined period are sequentially subjected to sampling.

Here, the output signal SR1 is already in the Low level, and the switch P_ASW1 can be set in the non-conductive state, and a collision between the pre-charge potential PVID and the potential of the video signal VIDEO in the data signal line SL1 can be prevented. Incidentally, the switch P_ASW2 is conducted by the output signal SR1, and thus the video signal VIDEO is outputted to the data signal line SL1, at the same time, the data signal line SL2 and the pixel capacitance are pre-charged. On the other hand, the output signal LSO1 becomes a reset signal of the flip-flop SRFF1, and the output signal DZB1 of the SRFF1 therefore becomes High level. As a result, the level shifter circuit LSD1 stops the level shifting operation.

Here, in the case of adopting a D flip-flop in which flip-flops as level shifters are cascade connected, both an input signal and an output signal of the D flip-flop in each stage are needed to control on/off of the operation of the level shifter circuit. In response, the shift register 33a of the present embodiment adopts a set-reset type flip flop, and therefore, only an output signal of the flip-flop in the previous stage is needed to control on/off of the operation of the level shifter circuit. As a result, the shift registers of the simplified structure can be realized.

Fourth Embodiment

Figure 9:
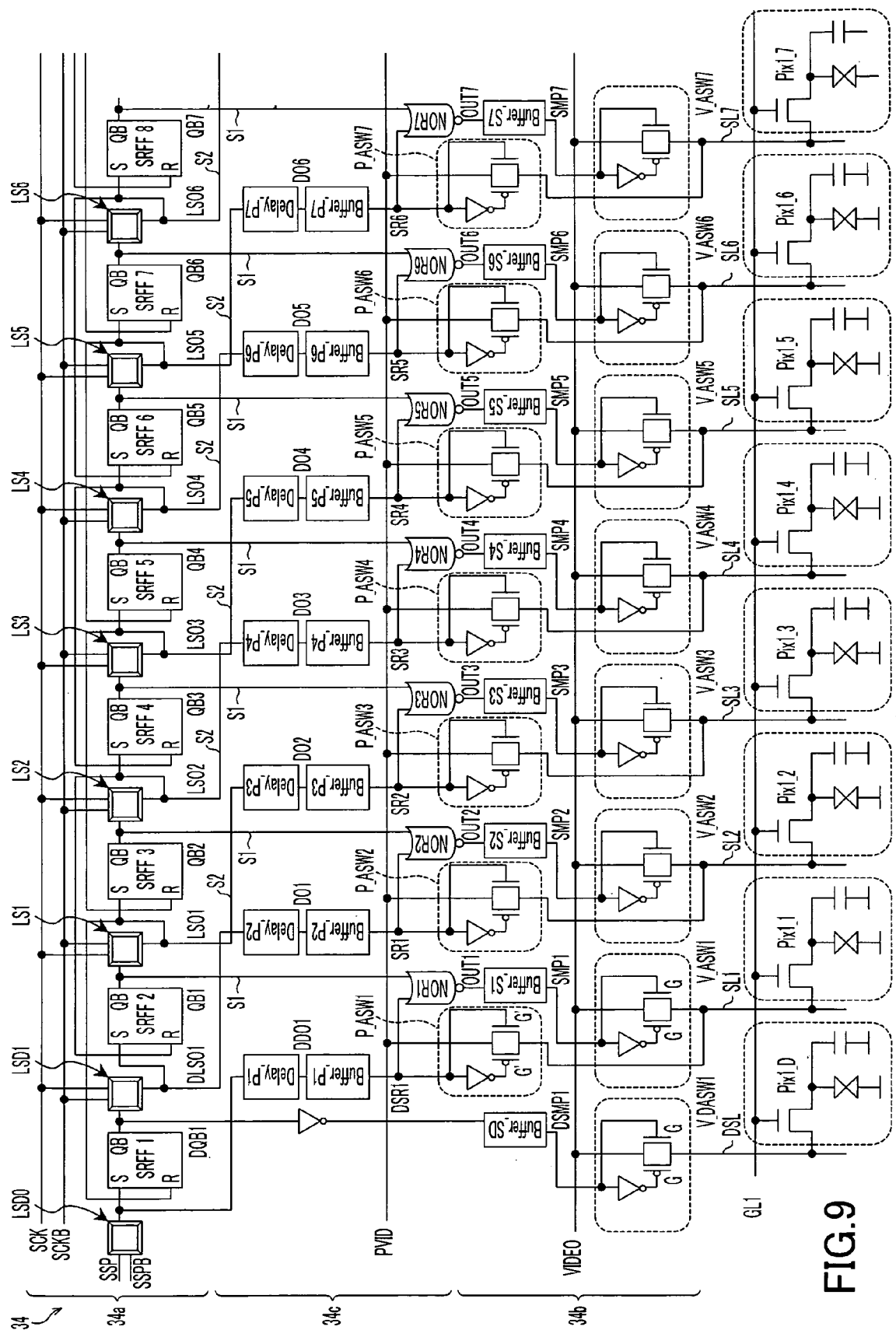
FIG. 9 is a circuit block diagram showing an arrangement of a data signal line driver in accordance with the fourth embodiment of the present invention.
Figure 10:
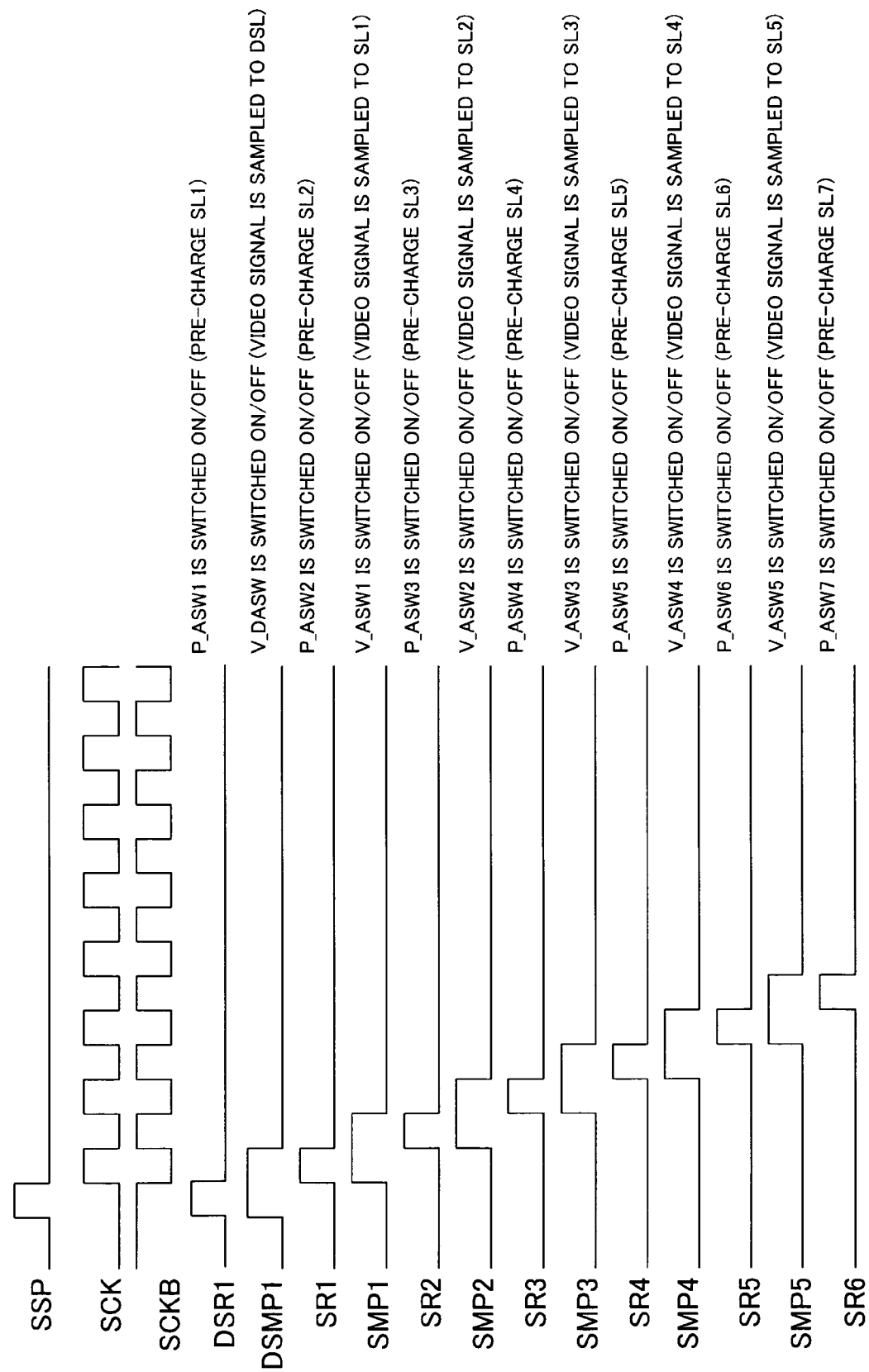
FIG. 10 is a timing chart of signals regarding the operation of the data signal line driver of FIG. 9.

The following will explain still another embodiment of the present invention with reference to FIGS. 9 and 10. For ease of explanation, members having the same functions as those shown in the drawings pertaining to the first through third embodiments will be given the same reference symbols, and explanation thereof will be omitted here. In the present embodiment, explanations will be given only for the structure different from that of the first embodiment.

A driver circuit of a display apparatus in accordance with the present embodiment is a data signal line driver of a liquid crystal display apparatus. FIG. 9 shows the structure of a data signal line driver 34.

The data signal line driver 34 includes a shift register 34a, a sampling section 34b and a superimposition preventing section 34c.

The respective structures of the shift register 34a and the superimposition preventing section 34c are the same as the shift register 33a and the superimposition preventing section 33c of FIG. 1, and only the sampling section 34b is different in structure from the sampling section 33b of FIG. 7. Specifically, in the sampling section 33b of FIG. 7, on the input side of the data signal line SL1 in the first line, provided is a dummy data signal line DSL connected to a dummy pixel Pixm_D (m=1, 2, ..., n=1, 2, ...), and the buffer circuit Buffer-SD is also provided corresponding to the dummy data signal line DSL. In the structure of the present embodiment, the output signal DQB1 from the flip flop SRFF1 in the first stage which is not used in the shift register 33a of FIG. 7 is inputted to the buffer circuit Buffer_SD via the inverter circuit.

The data signal line driver 34 of the foregoing structure is suitably applied to the driver circuit of the display apparatus provided with a dummy data signal line and a dummy pixel. Incidentally, such dummy pixel is generally provided under the shielding member called "black matrix", and a display of the pixel does not appear in the display. It is therefore not necessary to pre-charge the dummy pixel Pixm_D and the data signal line DSL.

FIG. 10 is a timing chart showing the operation of the data signal line driver 34 of the foregoing structure. The signal transmission principle of the data signal line driver 34 is the same as that of FIG. 7, and the detailed explanations thereof will be omitted here.

Fifth Embodiment

Figure 11:
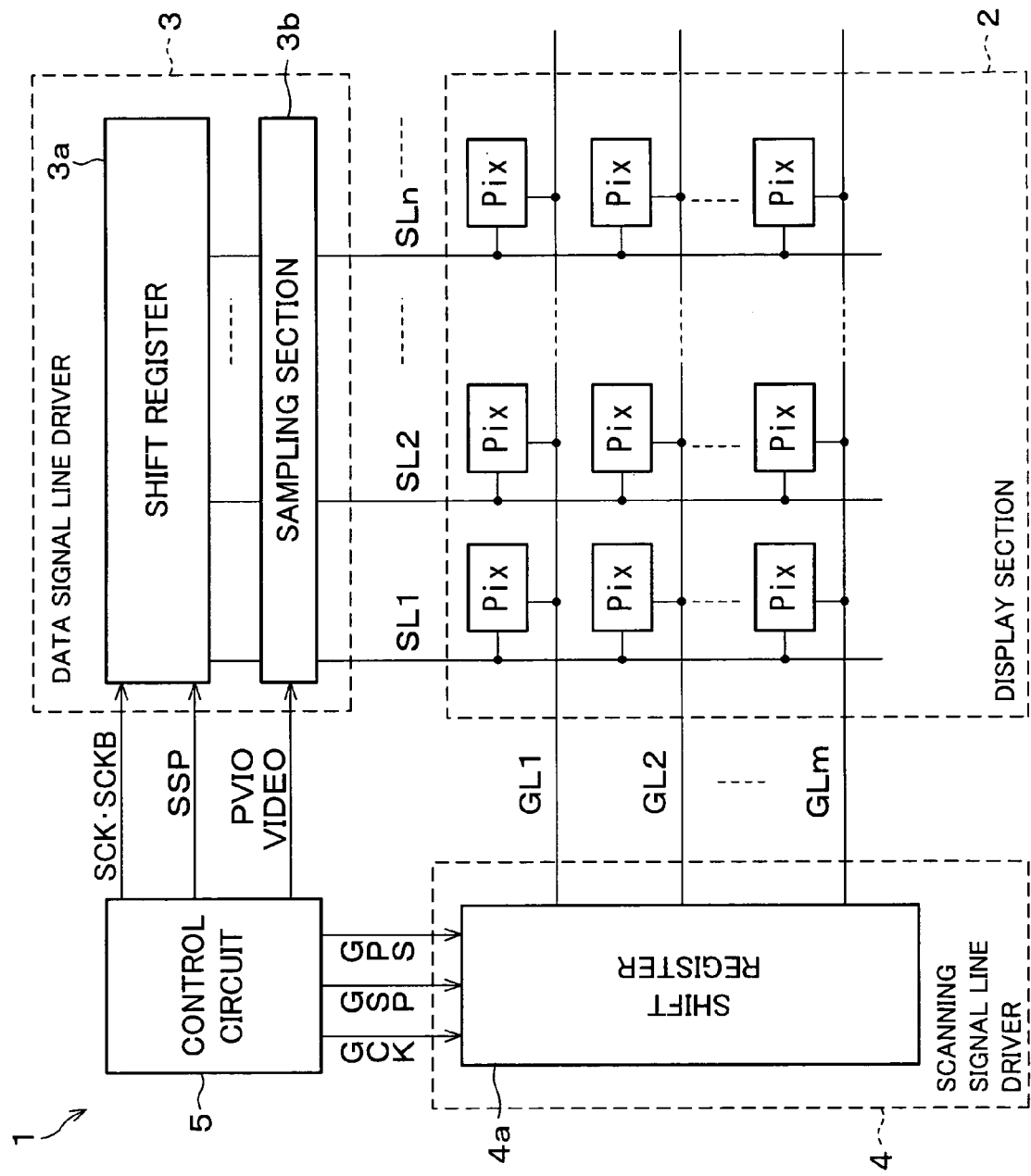
FIG. 11 is a circuit block diagram showing the structure of the display apparatus in accordance with the fifth embodiment of the present invention.

The following will explain a still another embodiment of the present invention with reference to FIG. 11. For ease of explanation, members having the same functions as those shown in the drawings pertaining to the first through fourth embodiments will be given the same reference symbols, and explanation thereof will be omitted here.

FIG. 11 shows a liquid crystal display apparatus 1 as an example of the display apparatus according to the present embodiment.

The liquid crystal display apparatus 1 is an active matrix type liquid crystal display apparatus of the dot sequential driving method by the AC driving. The liquid crystal display apparatus 1 includes a display section 2 having pixels Pix arranged in a matrix form, a data signal line driver 3 and a scanning signal line driver 4 for driving these pixels Pix, a control circuit 5, data signal lines SL, and scanning signal lines GL. The control circuit 5 generates a video signal VIDEO which shows a display state of each pixel Pix, so as to carry out image display based on the video signal VIDEO.

Here, the Pixm_n (m=1, 2, ..., n=1, 2, ...) and the dummy pixel of the display section 2 are the same those explained in the foregoing first through fourth embodiments. For the data signal line driver 3, any one of data signal line drivers 31 through 34 explained in the first through fourth embodiments is adopted. A shift register 3a and a sampling section (writing circuit, pre-charge circuit) 3b of the data signal line driver 3 correspond to the shift registers 31a through 34a, and the sampling sections 31b through 34b of the first through fourth embodiments.

Further, the scanning signal line driver 4 is a circuit for sequentially driving the scanning signal line GLn explained in the first through fourth embodiments, and selects the MOSFET (TFT) of the pixel connected to the scanning signal line GLn. Further, the scanning signal line driver 4 includes a shift register 4 which transfers a timing signal for line sequentially carrying out the selection of the scanning signal line GLn.

The display section 2, the data signal line driver 3, and the scanning signal line driver 4 are provided on the same substrate for reduction of both manufacturing processes, and wiring capacitance and wiring resistance. Further in order to integrate as many pixels Pix as possible, and to enlarge the display area, the display section 2, the data signal line driver 3, and the scanning signal line driver 4 are made up of a polycrystalline silicon thin film transistor formed on a glass substrate. Further, the polycrystalline silicon thin film transistor is manufactured with a process temperature of not more than 600° C. so as to avoid warpage or bending caused by a process performed at or above the strain point when adopting a generally used glass substrate (the strain point is 600° C. or below).

Further, the control circuit 5 generates a clock signals SCK and SCKB, a start pulse SSR, a pre-charging potential PVID, and a video signal VIDEO, and outputs these signals to the data signal line driver 3. Further, the control circuit 5 generates a clock signal GCK, a start pulse GSP, and a signal GPS, and outputs these signals to the scanning signal line driver 4.

With the foregoing structure, the liquid crystal display apparatus 1 offers the effects as achieved from the first through fourth embodiments, thereby realizing a high quality display.

Further, the display apparatus of the present invention is not limited to the liquid crystal display apparatus but may be any display apparatuses requiring charging of the wiring capacitance, such as an organic EL display apparatus.

Sixth Embodiment

Figure 12:
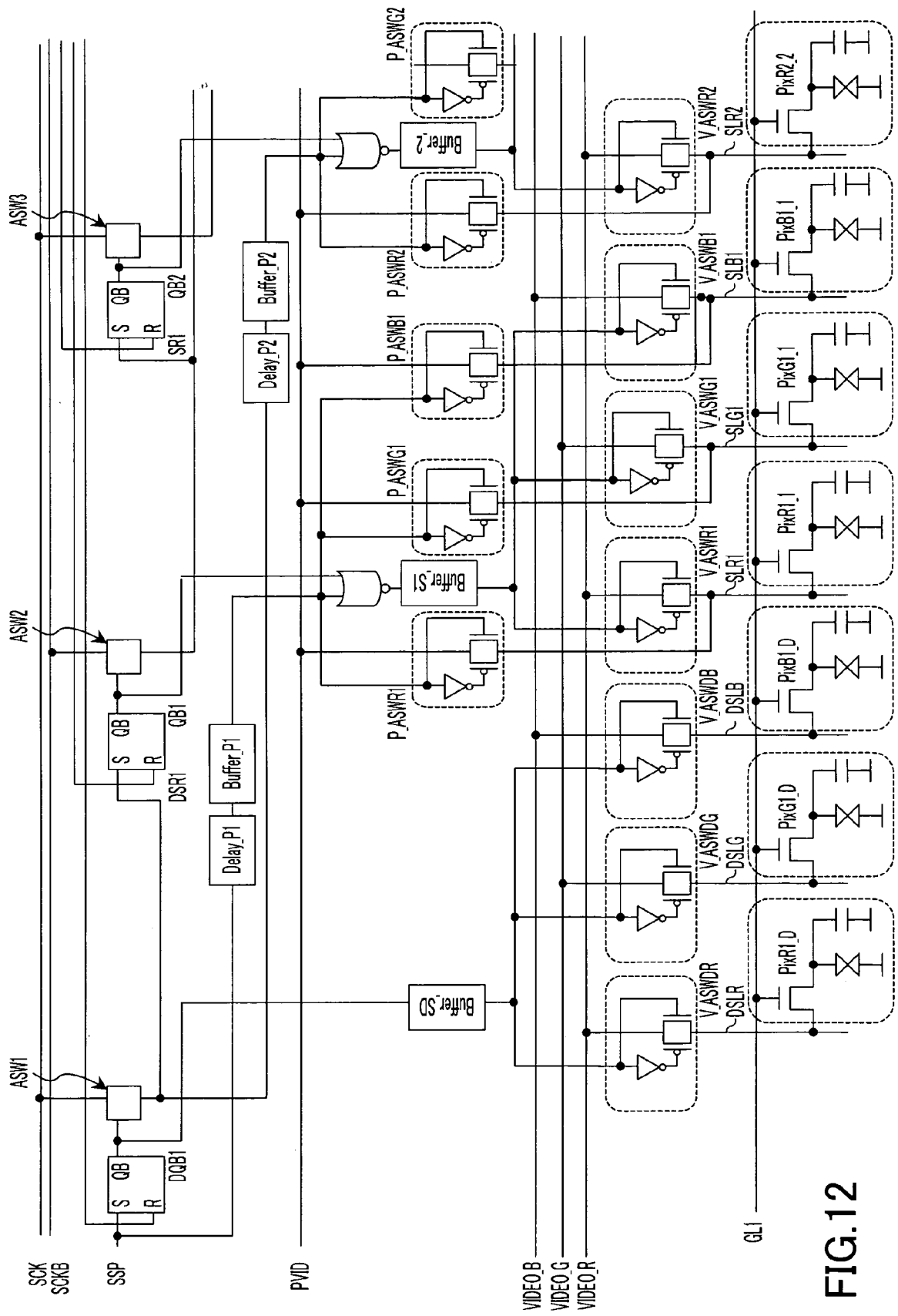
FIG. 12 is a circuit block diagram showing the structure of another data signal line in accordance with the sixth embodiment of the present invention.
Figure 13:
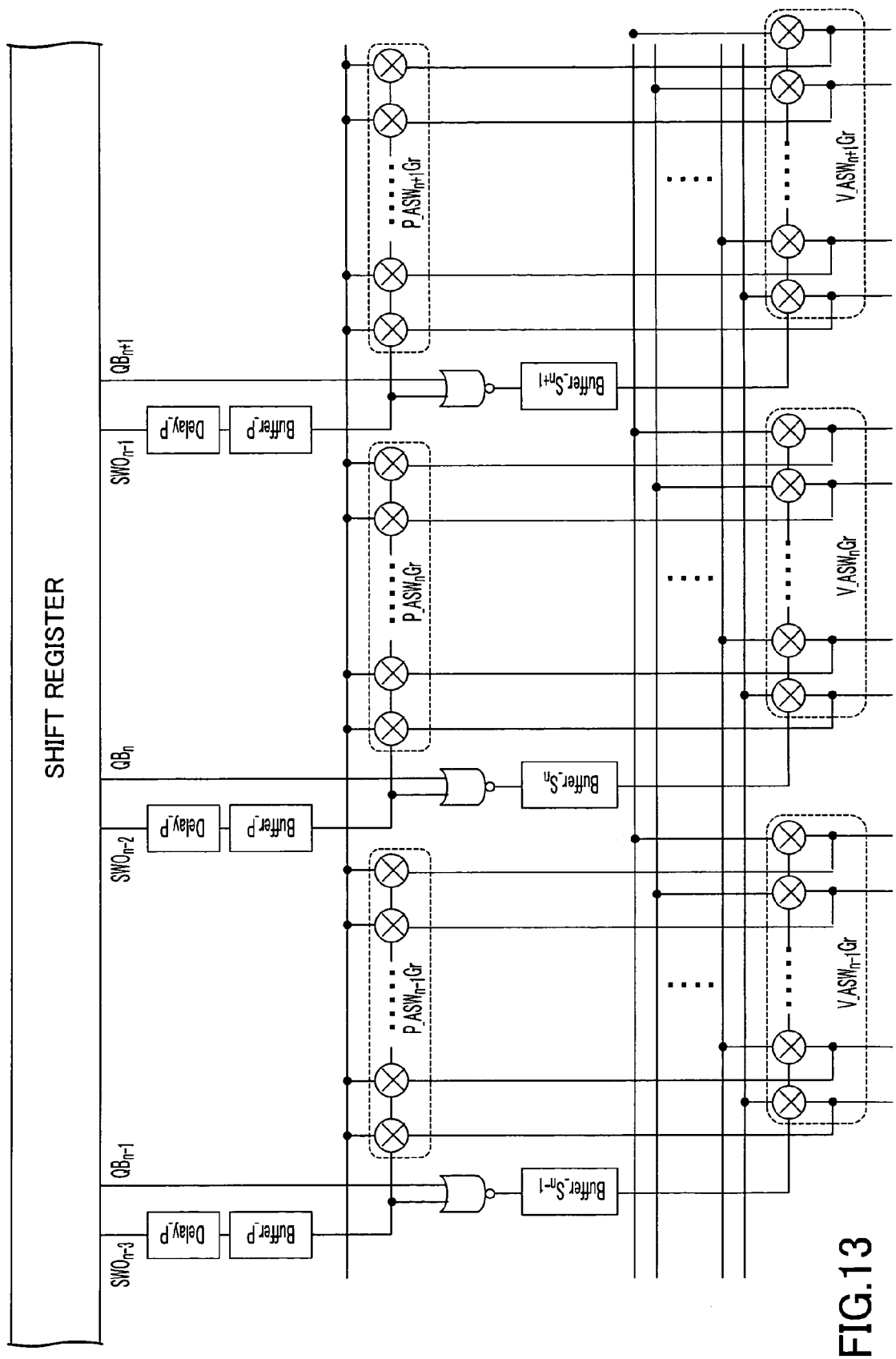
FIG. 13 is a circuit block diagram showing the structure of a part of the data signal line driver in accordance the sixth embodiment of the present invention.

The following will explain a still another embodiment of the present invention with reference to FIGS. 12 and 13. For ease of explanation, members having the same functions as those shown in the drawings pertaining to the first through fifth embodiments will be given the same reference symbols, and explanation thereof will be omitted here.

The driver circuits for a display apparatus described in the first through fourth embodiment adopt a so-called dot sequential driving system, in which a write signal is sequentially inputted to a plurality of data signal lines. Specifically, for example, for the driver circuit of a display apparatus of the first embodiment, the output QB of the shift register for controlling on/off (conductive state and non-conductive state) of the switch V_ASW for sampling, the set signal for the next stage of the flip flop SRFF of the shift register, and the signal SR for controlling the conductive state and the non-conductive state of the switch P_ASW for pre-charging are related to a switch in one line; however, as shown in FIG. 12, the present invention may also be adopted for 3-line sampling with RGB signals.

Further, as shown in FIG. 13, the present invention may be arranged so as to develop the video signal in plural lines to delay the sampling period of the video signal. For simplification, in FIG. 13, the switch for pre-charging and the switch for actual sampling are denoted by different symbols from those in FIG. 12; however, the switches of the same structure as those of FIG. 12 can be adopted in the structure of FIG. 13. Similarly, the shift register and the buffer group are shown by different symbols in FIG. 13 from those in FIG. 12. However, the shift register and the buffer group of the same structures as those of FIG. 12 may be adopted in the structure of FIG. 13. However, it should be noted here that the driving performance of the buffer group has to be sufficient according to the number of lines for pre-charging and sampling.

Here, in the structures of FIGS. 12 and 13 which carry out sampling of i (i is an integer not less than 2) lines with the units of i signal supply lines, it is arranged so that the switches for sampling sequentially become conductive in the units, and the switches included in each of the units are set in the conductive state at the same time, and also the number of switch circuits corresponds to the number of the signal supply lines, and the switches for pre-charging are set in the conductive state sequentially in the units of i signal supply lines, and the signal supply lines in each unit are set in the conductive state at the same time. The operation of the foregoing structure is basically the same as that of 1-line structure; however, the foregoing plural line structure differs in that the plural switches for pre-charging are set in the conductive state at the same time and also the plural switches for sampling are set in the conductive state at the same time. Further, the present invention is not limited to the examples of FIGS. 12 and 13, and to the driver circuits for a display apparatus shown in the first through fourth embodiments, the sampling method and pre-charging method using plural lines shown in FIGS. 12 and 13 can be applied.

In order to achieve the foregoing object, the first driver circuit of a display apparatus is characterized by including:

a writing circuit having a plurality of first switches respectively provided for signal supply lines of the display apparatus, the writing circuit being provided for inputting a write signal into each of the signal supply lines by conducting each of the plurality of first switches;

a shift register having flip-flops of plural stages, the shift register being provided for sequentially outputting a timing pulse from each of the flip-flops of plural stages to conduct each of the first switches; and a pre-charge circuit having a plurality of second switches respectively provided for the signal supply lines, the pre-charge circuit being provided for pre-charging each of the signal supply lines by conducting each of the plurality of second switches, wherein the shift register includes a plurality of pulse signal supply circuits provided corresponding to the signal supply lines to be pre-charged while an input operation of the write signal is being carried out, and each of the pulse signal supply circuits receives a clock signal different from the timing pulse, in response to an input of the timing pulse as outputted from each of the flip-flops, and outputs as a pre-charge pulse, a pulse signal in sync with the clock signal to a second switch corresponding to a prescribed signal supply line to which the input operation of the write signal is not being carried out to conduct the second signal; and in each output line of the timing pulse, provided is a superimposition preventing section made up of a superimposition removing circuit for removing from the timing pulse to be supplied to the output line, an overlapped part which is overlapped with the pre-charge pulse for pre-charging the signal supply line to which the input operation of the write signal is to be carried out by the timing pulse.

According to the foregoing structure, the first switch of the writing circuit is conducted by a timing pulse for use in inputting a write signal from each flip flop. On the other hand, the second switch of the pre-charge circuit is conducted by a clock signal which is different from the timing pulse as received by a pulse signal supply circuit.

In the effective writing period, an input operation of a write signal is being inputted to each signal supply line. However, when a timing pulse is outputted from the flip flop, a clock signal outputted from a pulse signal supply circuit which receives a timing pulse as outputted from the flip flop in the stage directly before that flip flop is used to pre-charge the prescribed signal supply line to which an input operation of a write signal is not being carried out.

As described, according to the foregoing characteristic of the present invention, while a write signal is being inputted in a signal supply line, it is possible to pre-charge another signal supply line. Here, a supply line for supplying timing pulse for inputting a write signal is provided separately from a supply line for supplying a pre-charge signal. Therefore, such problem that a large amount of current flowing into a signal supply line when pre-charging causes fluctuations in potential of the write signal of the signal supply line to which an input operation of the write signal is being carried out via the capacitive control terminals of the first switch and the second switch can be prevented. Then, according to the foregoing structure, the superimposition removing circuit provided in each output line of the timing pulse removes from the timing pulse to be supplied to the output line, an overlapped part which is overlapped with the pre-charge pulse for pre-charging the signal supply line to which the input operation of the write signal is to be carried out by the timing pulse. Therefore, even when using an output from the flip flop in which a fall edge of the pre-charge pulse is in sync with a rise edge of the timing pulse, the fall edge of the pre-charge pulse is not overlapped with the rise edge of the timing pulse. As a result, for a pair of a first switch and a second switch provided in each signal line, respectively for sampling and pre-charging, the first switch and the second switch will not be conducted at the same time, and a collision between the write signal and the pre-charge potential in the signal supply line can be surely prevented.

Incidentally, the superimposition between the timing pulses can be a cause of fluctuations in potential of the video signal line, which in turn causes deterioration in image quality due to less uniform display, for example. As described, however, by regulating the front edge of the timing pulse by the rear edge of the corresponding pre-charge pulse, the rear edge of the timing pulse may be also partially cut off depending on an amount of displacement of the rear edge of the pre-charge pulse, and in this case, it is also possible to prevent the superimposition between the timing pulses.

With this structure, it is possible to realize a driver circuit storing a pre-charge circuit of a display apparatus, which can surely prevent a collision between the pre-charge potential and the video signal in a signal supply line when pre-charging the signal supply line from a pre-charge power supply of a low driving performance, while maintaining the number of stages of shift registers to be the required minimum number.

The second driver circuit of a display apparatus of the present invention is characterized by including:

a writing circuit having a plurality of first switches respectively provided for signal supply lines of the display apparatus, the writing circuit being provided for inputting a write signal into each of the signal supply lines by conducting each of the plurality of first switches;

a shift register having flip-flops of plural stages, the shift register being provided for sequentially outputting a timing pulse from each of the flip-flops of plural stages to conduct each of the first switches; and a pre-charge circuit having a plurality of second switches respectively provided for the signal supply lines, the pre-charge circuit being provided for pre-charging each of the signal supply lines by conducting each of the plurality of second switches, wherein the shift register includes a plurality of pulse signal supply circuits provided corresponding to the signal supply lines to be pre-charged while an input operation of the write signal is being carried out, and each of the pulse signal supply circuits receives a clock signal different from the timing pulse, in response to an input of the timing pulse as outputted from each of the flip-flops, and outputs as a pre-charge pulse, a pulse signal in sync with the clock signal to a second switch corresponding to a prescribed signal supply line to which the input operation of the write signal is not being carried out to conduct the second signal;

in each output line of the timing pulse, provided is a superimposition preventing section made up of a superimposition removing circuit for removing from the timing pulse to be supplied to the output line, an overlapped part which is overlapped with the pre-charge pulse for pre-charging the signal supply line to which the input operation of the write signal is to be carried out by the timing pulse;

the superimposition preventing section includes a pulse front edge cut-off circuit provided for each output line of the pre-charge pulse, the pulse front edge cut-off circuit being provided for cutting off a front edge of the pre-charge pulse to be supplied to the output line; and the pre-charge pulse having its front edge cut off by the pulse front edge cut-off circuit is inputted to the superimposition removing circuit.

According to the foregoing structure, as the pulse front edge cut off circuit cuts off the front edge of the pre-charge pulse, even when the front or rear edge of the pre-charge pulse is dragged, a superimposition between the pre-charge pulses can be avoided. As a result, in addition to the effect as achieved from the driver circuit of the first display apparatus, it is possible to surely prevent such problem that a data signal line which is not supposed to be charged is pre-charged, which may result in insufficient driving performance of the pre-charge power supply.

The foregoing first or second driver circuit of the display apparatus of the present invention may be characterized in that:

each of the flip flops is a set-reset type flip flop; and each of the plurality of pulse signal supply circuits outputs the pulse signal, also as a set signal of the flip flop in a subsequent stage of the flip flop which outputs the timing pulse.

The foregoing first or second driver circuit of the present invention may be characterized in that aid pulse signal supply circuit is a switch circuit, or the pulse signal supply circuit is a level shifter circuit.

According to the structure wherein a switch circuit is adopted for the pulse signal supply circuit, it is possible to reduce the size of the circuit. According to the structure wherein a level shifter circuit is adopted for the pulse signal supply circuit, it is possible to operate the shift register under normal conditions by level-shifting an input signal in the level shifter circuit, even when an externally input signal has a smaller amplitude than the driving voltage of the shift register, and the shift register cannot be operated under normal conditions without amplifying the input signal.

The foregoing first or second driver circuit of the present invention may be further characterized in that:

the output lines of the timing pulse are provided in number corresponding to the number of the signal supply lines so as to sequentially conduct each of the plurality of first switches; and the pulse signal supply circuits are provided in number corresponding to the number of the signal supply lines so as to sequentially conduct each of the plurality of second switches.

According to the foregoing structure, for the driver circuit adopting a so-called dot sequential driving method, wherein a write signal is sequentially inputted to each signal supply line based on a timing pulse from a flip flop, it is possible to provide a driver circuit storing a pre-charge circuit of a display apparatus, in which signal supply lines are dot sequentially conducted under the control by the switch circuit, which can surely prevent a collision between the potential of the pre-charge signal and the potential of the video signal in a signal supply line when pre-charging the signal supply line from a pre-charge power supply of a small driving performance, while maintaining the number of stages of shift registers to be the required minimum number.

The first and second driver circuit of a display apparatus of the present invention may be further characterized in that:

the output lines of the timing pulse are provided in number corresponding to the number of groups of the signal supply lines, each group being made up of signal supply lines in number of i (i is an integer of not smaller than 2), so as to conduct the plurality of first switches in such a manner that first switches in a same group conduct all at the same time, and the first switches in respective groups sequentially conduct; and the pulse signal supply circuits are provided in number corresponding to the number of the groups of signal supply lines so as to conduct the plurality of second switches in such a manner that second switches in a same group conduct all at the same time, and the second switches in respective groups sequentially conduct.

According to the foregoing structure, for the driver circuit adopting a so-called multipoint simultaneous driving method, wherein a write signal is sequentially inputted to each group of signal supply lines based on a timing pulse from a flip flop, it is possible to provide a driver circuit storing a pre-charge circuit of a display apparatus, in which signal supply lines are dot sequentially conducted under the control by the switch circuit, which can surely prevent a collision between the potential of the pre-charge signal and the potential of the video signal in a signal supply line when pre-charging the signal supply line from a pre-charge power supply of a small driving performance, while maintaining the number of stages of shift registers to be the required minimum number.

In order to achieve the foregoing object, a display apparatus of the present invention is characterized by including:

a plurality of pixels;

a plurality of data signal lines which serve as a plurality of signal supply lines, the plurality of data signal lines being provided so as to correspond to the plurality of pixels;

a plurality of scanning signal lines which serve as a plurality of signal supply lines, the plurality of scanning signal lines being provided so as to correspond to the plurality of pixels, a data signal line driver for writing a video signal as a write signal in the plurality of data signal lines and the plurality of pixels; and a scanning signal line driver for writing a scanning signal as a write signal in the plurality of scanning signal lines for selecting a pixel to which the video signal is written, wherein the data signal line driver may be any one of the foregoing structures of the present invention.

According to the foregoing structure of the present invention, in the data signal line driver, storing a pre-charge circuit, a collision between the pre-charge potential and the video signal in a signal supply line can be surely prevented when pre-charging the signal supply line from a pre-charge power supply of a small driving performance, while maintaining the number of stages of shift registers to be the required minimum number. It is therefore possible to realize high quality display apparatus with an improved display uniformity.

As described, the first driver circuit of a display apparatus of the present invention is arranged such that the shift register includes a plurality of pulse signal supply circuits provided corresponding to the signal supply lines to be pre-charged while an input operation of the write signal is being carried out, and each of the pulse signal supply circuits receives a clock signal different from the timing pulse, in response to an input of the timing pulse as outputted from each of the flip-flops, and outputs as a pre-charge pulse, a pulse signal in sync with the clock signal to a second switch corresponding to a prescribed signal supply line to which the input operation of the write signal is not being carried out to conduct the second signal; and in each output line of the timing pulse, provided is a superimposition preventing section made up of a superimposition removing circuit for removing from the timing pulse to be supplied to the output line, an overlapped part which is overlapped with the pre-charge pulse for pre-charging the signal supply line to which the input operation of the write signal is to be carried out by the timing pulse.

With this structure, it is possible to realize a driver circuit storing a pre-charge circuit of a display apparatus, which can surely prevent a collision between the pre-charge potential and the video signal in a signal supply line when pre-charging the signal supply line from a pre-charge power supply of a low driving performance, while maintaining the number of stages of shift registers to be the required minimum number.

As described, the display apparatus of the present invention is arranged so as to include:

a plurality of pixels;

a plurality of data signal lines which serve as a plurality of signal supply lines, said plurality of data signal lines being provided so as to correspond to said plurality of pixels;

a plurality of scanning signal lines which serve as a plurality of signal supply lines, said plurality of scanning signal lines being provided so as to correspond to said plurality of pixels, a data signal line driver for writing a video signal as a write signal in said plurality of data signal lines and said plurality of pixels; and a scanning signal line driver for writing a scanning signal as a write signal in said plurality of scanning signal lines for selecting a pixel to which the video signal is written, wherein said data signal line driver may be any one of the foregoing structures of the present invention.

According to the foregoing structure of the present invention, in the data signal line driver, storing a pre-charge circuit, a collision between the pre-charge potential and the video signal in a signal supply line can be surely prevented when pre-charging the signal supply line from a pre-charge power supply of a small driving performance, while maintaining the number of stages of shift registers to be the required minimum number. It is therefore possible to realize high quality display apparatus with improved display uniformity.

The present invention is suitably applied to a data signal line driving circuit, etc., in an image display apparatus or other display apparatuses.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

What is claimed is:

1. A driver circuit of a display apparatus, comprising:

a writing circuit having a plurality of first switches respectively provided for signal supply lines of the display apparatus, said writing circuit being provided for inputting a write signal into each of said signal supply lines by conducting each of said plurality of first switches;

a shift register having flip-flops of plural stages, said shift register being provided for sequentially outputting a timing pulse from each of said flip-flops of plural stages to conduct each of said first switches;

a pre-charge circuit having a plurality of second switches respectively provided for the signal supply lines, said pre-charge circuit being provided for pre-charging each of said signal supply lines by conducting each of said plurality of second switches, wherein said shift register includes a plurality of pulse signal supply circuits provided corresponding to said signal supply lines to be pre-charged while an input operation of the write signal is being carried out, and each of said pulse signal supply circuits receives a clock signal different from the timing pulse, in response to an input of the timing pulse as outputted from each of said flip-flops, and outputs as a pre-charge pulse, a pulse signal in sync with the clock signal to a second switch corresponding to a prescribed signal supply line to which the input operation of the write signal is not being carried out to conduct said second switches; and a superimposition preventing section including, a pulse front edge cut-off circuit provided for each output line of the pre-charge pulse, said pulse front edge cut-off circuit being provided for cutting off a front edge of the pre-charge pulse to be supplied to the output line, a buffer circuit which amplifies a current of the pre-charge pulse as input from said pulse front edge cut-off circuit, and a superimposition removing circuit for removing from the timing pulses to be supplied from said flip-flops to said first switches, an overlapped part which is overlapped with the pre-charge pulse to be supplied from said buffer circuit to said second switches, wherein overlapping of the pre-charge pulse and the liming pulse is prevented, and overlapping of the timing pulses is prevented.

2. The driver circuit as set forth in claim 1, wherein:

said pulse front edge cut-off circuit is a delay circuit.

3. The driver circuit as set forth in claim 2, wherein said delay circuit includes:

an inverter circuit for outputting an inversed signal of the pre-charge pulse as inputted from each of said plurality of pulse signal supply circuits;

a delay inverter circuit, provided in a latter stage of said inverter circuit, which delays the inversed signal and outputs the inversed signal as delayed; and a nor circuit, provided in a latter stage of the inverter circuit and the delay inverter circuit, which receives the inversed signal and the inversed signal as delayed by said delay inverter circuit, and outputs the pre-charge pulse based on these input signals to the superimposition removing circuit.

4. The driver circuit as set forth in claim 1, wherein:
said buffer circuit is made up of a plurality of inverter circuits of a cascade connection.

5. The driver circuit as set forth in claim 1, wherein:
each of said flip flops is a set-reset type flip flop; and
each of said plurality of pulse signal supply circuits outputs the pulse signal, also as a set signal of the flip flop in a subsequent stage of the flip flop which outputs the timing pulse.

6. The driver circuit as set forth in claim 1, wherein:
said pulse signal supply circuit is a switch circuit.

7. The driver circuit as set forth in claim 1, wherein:
said pulse signal supply circuit is a level shifter circuit.

8. The driver circuit as set forth in claim 1, wherein:
said output lines of the timing pulse are provided in number corresponding to the number of the signal supply lines so as to sequentially conduct each of said plurality of first switches; and
said pulse signal supply circuits are provided in number corresponding to the number of the signal supply lines so as to sequentially conduct each of said plurality of second switches.

9. The driver circuit as set forth in claim 1, wherein:
said output lines of the timing pulse are provided in number corresponding to the number of groups of the signal supply lines, each group being made up of signal supply lines in number of i (i is an integer of not smaller than 2), so as to conduct said plurality of first switches in such a manner that first switches in a same group conduct all at the same time, and the first switches in respective groups sequentially conduct; and
said pulse signal supply circuits are provided in number corresponding to the number of the groups of signal supply lines so as to conduct said plurality of second switches in such a manner that second switches in a same group conduct all at the same time, and the second switches in respective groups sequentially conduct.

10. A display apparatus comprising:
a plurality of pixels;
a plurality of data signal lines which serve as a plurality of signal supply lines, said plurality of data signal lines being provided so as to correspond to said plurality of pixels;
a plurality of scanning signal lines which serve as a plurality of signal supply lines, said plurality of scanning signal lines being provided so as to correspond to said plurality of pixels;
a data signal line driver for writing a video signal as a write signal in said plurality of data signal lines and said plurality of pixels; and
a scanning signal line driver for writing a scanning signal as a write signal in said plurality of scanning signal lines for selecting a pixel to which the video signal is written,
said data signal line driver includes, a writing circuit having a plurality of first switches respectively provided for signal supply lines of the display apparatus, said writing circuit being provided for inputting a write signal into each of said signal supply lines by conducting each of said plurality of first switches, a shift register having flip-flops of plural stages, said shift register being provided for sequentially outputting a timing pulse from each of said flip-flops of plural stages to conduct each of said first switches, a pre-charge circuit having a plurality of second switches respectively provided for the signal supply lines, said pre-charge circuit being provided for pre-charging each of said signal supply lines by conducting each of said plurality of second switches, wherein said shift register includes a plurality of pulse signal supply circuits provided corresponding to said signal supply lines to be pre-charged while an input operation of the write signal is being carried out, and each of said pulse signal supply circuits receives a clock signal different from the timing pulse, in response to an input of the timing pulse as outputted from each of said flip-flops, and outputs as a pre-charge pulse, a pulse signal in sync with the clock signal to a second switch corresponding to a prescribed signal supply line to which the input operation of the write signal is not being carried out to conduct said second switches, and a superimposition preventing section including,
a pulse front edge cut-off circuit provided for each output line of the pre-charge pulse, said pulse front edge cut-off circuit being provided for cutting off a front edge of the pre-charge pulse to be supplied to the output line, a buffer circuit which amplifies a current of the pre-charge pulse as inputted from said pulse front edge cut-off circuit, and a superimposition removing circuit for removing from the timing pulses to be supplied from said flip-flops to said first switches, an overlapped part which is overlapped with the pre-charge pulse to be supplied from said buffer circuit to said second switches, wherein
overlapping of the pre-charge pulse and the timing pulse is prevented, and overlapping of the timing pulses is prevented.

11. The display apparatus as set forth in claim 10, wherein:
said pulse front edge cut-off circuit is a delay circuit.

12. The display apparatus as set forth in claim 11, wherein said delay circuit includes:

an inverter circuit for outputting an inversed signal of the pre-charge pulse as inputted from each of said plurality of pulse signal supply circuits;

a delay inverter circuit, provided in a latter stage of said inverter circuit, which delays the inversed signal and outputs the inversed signal as delayed; and a nor circuit, provided in a latter stage of the inverter circuit and the delay inverter circuit, which receives the inversed signal and the inversed signal as delayed by said delay inverter circuit, and outputs the pre-charge pulse based on these input signals to the superimposition removing circuit.

13. The display apparatus as set forth in claim 10, wherein:
said buffer circuit is made up of a plurality of inverter circuits of a cascade connection.

14. The display apparatus as set forth in claim 10, wherein:
each of said flip flops is a set-reset type flip flop; and
each of said plurality of pulse signal supply circuits outputs the pulse signal, also as a set signal of the flip flop in a subsequent stage of the flip flop which outputs the timing pulse.

15. The display apparatus as set forth in claim 10, wherein:
said pulse signal supply circuit of said driver circuit is a switch circuit.

16. The display apparatus as set forth in claim 10, wherein:
said pulse signal supply circuit of said driver circuit is a level shifter circuit.

17. The driver circuit as set forth in claim 10, wherein:
in said driver circuit,
said output lines of the timing pulse are provided in number corresponding to the number of the signal supply lines so as to sequentially conduct each of said plurality of first switches; and
said pulse signal supply circuits are provided in number corresponding to the number of the signal supply lines so as to sequentially conduct each of said plurality of second switches.

18. The display apparatus as set forth in claim 10, wherein:
in said driver circuit,
said output lines of the timing pulse are provided in number corresponding to the number of groups of the signal supply lines, each group being made up of signal supply lines in number of i (i is an integer of not smaller than 2), so as to conduct said plurality of first switches in such a manner that first switches in a same group conduct all at the same time, and the first switches in respective groups sequentially conduct; and
said pulse signal supply circuits are provided in number corresponding to the number of the groups of signal supply lines so as to conduct said plurality of second switches in such a manner that second switches in a same group conduct all at the same time, and the second switches in respective groups sequentially conduct.

\* \* \* \* \*